US009477836B1

(12) United States Patent
Ramam et al.

(10) Patent No.: US 9,477,836 B1
(45) Date of Patent: Oct. 25, 2016

(54) CONTENT MODIFICATION IN SERVED CODE

(71) Applicant: Shape Security Inc., Palo Alto, CA (US)

(72) Inventors: Shishir Krovvidi Ramam, Campbell, CA (US); Shuman Ghosemajumder, Mountain View, CA (US); Marc R. Hansen, Mountain View, CA (US)

(73) Assignee: Shape Security, Inc., Palo Alto, CA (US)

( * ) Notice: Subject to any disclaimer, the term of this patent is extended or adjusted under 35 U.S.C. 154(b) by 181 days.

(21) Appl. No.: 14/259,869

(22) Filed: Apr. 23, 2014

(51) Int. Cl.
G06F 21/00 (2013.01)
G06F 21/56 (2013.01)

(52) U.S. Cl.
CPC ..................................... *G06F 21/56* (2013.01)

(58) Field of Classification Search
None
See application file for complete search history.

(56) References Cited

U.S. PATENT DOCUMENTS

| 5,832,212 | A | * | 11/1998 | Cragun ............. G06F 17/30867 707/E17.109 |
| 6,275,789 | B1 | * | 8/2001 | Moser ................... G06F 17/271 704/2 |
| 7,400,422 | B2 | | 7/2008 | Brown et al. |
| 7,480,385 | B2 | | 1/2009 | Weber |
| 7,707,223 | B2 | | 4/2010 | Zubenko et al. |
| 7,836,425 | B2 | | 11/2010 | Rubin et al. |
| 8,102,547 | B2 | | 1/2012 | Brown et al. |
| 8,200,958 | B2 | | 6/2012 | Coppola et al. |
| 8,266,202 | B1 | | 9/2012 | Colton et al. |
| 8,619,095 | B2 | | 12/2013 | Jaramillo et al. |
| 8,640,252 | B2 | | 1/2014 | Cragun et al. |
| 8,676,273 | B1 | * | 3/2014 | Fujisaki ............... H04M 1/6505 379/142.06 |
| 9,042,923 | B1 | * | 5/2015 | Mirho ..................... H04W 4/14 455/412.1 |
| 2004/0230889 | A1 | * | 11/2004 | Ishiyama ......... G06F 17/30905 715/205 |
| 2006/0156278 | A1 | * | 7/2006 | Reager ..................... G06F 8/70 717/104 |

(Continued)

FOREIGN PATENT DOCUMENTS

| EP | 2642718 A2 | 9/2013 |
| WO | WO 2013/091709 | 6/2013 |

OTHER PUBLICATIONS

Johnson, Gregory P.; Mock, Stephen A.; Westing, Brandt M.; Johnson, Gregory S. EnVision: A Web-Based Tool for Scientific Visualization. 9th IEEE/ACM International Symposium on Cluster Computing and the Grid. Pub. Date: 2009. http://ieeexplore.ieee.org/stamp/stamp.jsp?tp=&arnumber=5071929.*

(Continued)

*Primary Examiner* — Jeremiah Avery
(74) *Attorney, Agent, or Firm* — Fish & Richardson P.C.

(57) ABSTRACT

In some implementations, a computer system for obfuscating text in an electronic document can include an analysis module, a font data repository, a re-coding module, and a data interface. The analysis module is operable to identify strings of text from an electronic document. The font data repository can include one or more character maps that correlate, for each character map in the one or more character maps, a first set of characters with a respective different second set of characters. The re-coding module can generate a re-coded document by re-mapping, using a particular one of the one or more character maps, the identified strings of text into corresponding obfuscated strings of text, and by replacing the identified strings of text with the corresponding obfuscated strings of text from the electronic document. The data interface can transmit the re-coded document to a client computing device.

30 Claims, 10 Drawing Sheets

(56) References Cited

U.S. PATENT DOCUMENTS

| | | | |
|---|---|---|---|
| 2007/0027887 A1* | 2/2007 | Baldwin | G06F 17/279 707/999.1 |
| 2007/0073758 A1* | 3/2007 | Perry | G06F 17/30864 707/999.102 |
| 2008/0222736 A1 | 9/2008 | Boodaei et al. | |
| 2009/0193513 A1 | 7/2009 | Agarwal et al. | |
| 2009/0249310 A1 | 10/2009 | Meijer et al. | |
| 2009/0282062 A1 | 11/2009 | Husic | |
| 2010/0180346 A1 | 7/2010 | Nicolson et al. | |
| 2010/0257354 A1* | 10/2010 | Johnston | G06F 21/6209 713/153 |
| 2010/0262780 A1 | 10/2010 | Mahan et al. | |
| 2011/0178973 A1 | 7/2011 | Lopez et al. | |
| 2011/0296391 A1 | 12/2011 | Gass et al. | |
| 2012/0022942 A1 | 1/2012 | Holloway et al. | |
| 2012/0096116 A1 | 4/2012 | Mislove et al. | |
| 2012/0124372 A1* | 5/2012 | Dilley | H04L 67/2819 713/162 |
| 2013/0198607 A1 | 8/2013 | Mischook et al. | |
| 2014/0089786 A1 | 3/2014 | Hashmi | |
| 2015/0195305 A1 | 7/2015 | He | |

OTHER PUBLICATIONS

Sankaran, Naveen; Neelappa, Aman; Jawahar, C.V. Devanagari Text Recognition: A Transcription Based Formulation. 2013 12th International Conference on Document Analysis and Recognition. http://ieeexplore.ieee.org/stamp/stamp.jsp?tp=&arnumber=6628704.*

* cited by examiner

| Original Character | a | e | h | i | t | H | M | T |
|---|---|---|---|---|---|---|---|---|
| Original Unicode | 97 | 101 | 104 | 105 | 116 | 72 | 77 | 84 |
| Mapped Character | % | = | b | @ | < | # | R | O |
| Glyph | *a* | *e* | *h* | *i* | *t* | *H* | *M* | *T* |

FIG. 6A

"The Miami Heat remain atop the weekly Yahoo! Sports NBA rankings as they move closer to challenging a 41-year-old record.

The Heat are within six games of tying the 1971-72 Los Angeles Lakers' record 33-game winning streak after a 108-94 victory over the Orlando Magic on Monday night."

FIG. 6B

"Ob= R@%-@ #=%< m-=%@x %<6U <b= r=>Gd X%bb6ai 5U6m<T e7F m%x>@xnT %T <b=d -6t= zG6T=m <6 zb%GG=xn@xn % Λw|d=%m|6GL m=z6mLN*

*Ob= #=%< %m= r@<b@x T@c n%-=T 64 <d@xn <b= w0?w|?, 36T Fxn=G=T 3%>=mTs m=z6mL "|n%-= r@xx@xn T<m=%> %4<=m % w$J|0/ t@z<6md 6t=m <b= 8mG%xL6 R%n@z 6x R6xL%d x@nb<N"*

FIG. 6C

CONTENT MODIFICATION IN SERVED CODE

TECHNICAL FIELD

This document generally relates to computer security.

BACKGROUND

One common area of computer fraud involves attempts by organizations to infiltrate and compromise computers of ordinary people, and by that action to elicit confidential information or manipulate otherwise legitimate transactions. Various forms of malware are programmed to facilitate these fraudulent actions, for example, by analyzing sensitive information from textual content of webpages and other documents on client computing devices. To determine the content of a webpage, malware can identify strings of text that are arranged for display on the page. Characters in the strings of text may be encoded according to certain standards that assign unique numeric values to characters (e.g., the common ASCII character set or the newer Unicode character set), and these values can be understood across multiple computing platforms that execute the webpage so that the characters may be properly processed and displayed according to their original meaning.

SUMMARY

By techniques described herein, the exploitation of content in electronic documents is made more difficult by the obfuscation of one or more strings of text in the content. For example, techniques are described for changing the underlying text in a document or other electronic content so as to obfuscate such text and disguise its original meaning. In particular, the mapping for a character set may be changed in coordination with the graphical glyphs that represent characters in the character set. For example, the glyph for "G" might normally be character 114 in the character set and the glyph for "j" might be character 125. The techniques described here may replace the glyph for "G" with the glyph for "j," and then, for every served string that is given the new character set, change character representation 125 to 114 in each instance. As a result, the glyph "j" will be displayed, but malware looking at the character number will see 114, and think a "G" is being displayed. Substitutions of this type may be carried out across an entire character set in a coordinated and complex manner so that no characters are lost. Also, many different "substitute" character sets may be formed so that different substitute character sets are served in response to different requests for content, so as to create a form of moving target for malware that may try to reverse engineer the changes that are occurring in the character set. For example, malware might identify the 114-for-125 substitution from a particular website, but if the mapping changes frequently, then such knowledge by the malware will immediately become outdated and useless. Of course, the displayed text in the webpage can still be recognized by a human viewer as the original text, even though the underlying computer code representations of the characters have been scrambled. In short, the coding for characters is scrambled in a first direction, but the mapping of glyphs to the coding is scrambled in the opposite direction so that the visual appearance is unaffected.

In certain implementations, the glyphs can be modified from their original representations enough to interfere with malware attempts to "read" a displayed page, but not enough to interfere with a viewer's understanding of the text. For example, a small number of changes may be made to the rasterization of certain characters so that a machine-driven system cannot immediately recognize them, but a human viewer could (and changes may be made in kerning and other typographic aspects for the same purposes). Such efforts may be of limited effectiveness in most implementations, but may be employed as an additional mechanism by which to intervene in malicious interference.

In some implementations, a computer-implemented method can include determining, at a server system, a font map that is to be applied by a client computing device, wherein the font map maps character positions to glyphs that do not visually match characters at the character positions. A textual string can be identified to be served to the client computing device. The method can include converting the textual string by exchanging characters in the string with substitute characters, the converting corresponding to character exchanges that exist in the font map, and made so that presentation of the textual string with a normal font map will display unrecognizable text that does not match the identified textual string. The converted textual string can be provided to the client computing device for display on the client computing device using the font map so as to present text that renders like the identified textual string.

These and other implementations can include one or more of the following features. The method can further include providing, by the server system, the font map that is to be applied by the client computing device to the client computing device in conjunction with providing the converted textual string to the client computing device. The method can further include generating the font map by the server system. The textual string can be identified from code for a first web page as being text arranged for display in the first web page.

The method can further include receiving one or more indications that the first web page is to be served to a plurality of client computing devices; determining different font maps that are to be applied by respective ones of the plurality of client computing devices; converting, for each of the different font maps, the textual string by substituting characters in the textual string with substitute characters using a respective font map; and providing the converted textual strings in respective versions of the first web page to the plurality of client computing devices.

In some implementations, a computer-implemented can include identifying one or more strings of text to be served to and displayed on a client computing device, the one or more strings of text comprising original characters. A character map can be identified that correlates first characters with different second characters. The one or more strings of text can be re-mapped using the character map so as to produce one or more obfuscated strings ordered by changing the original characters to corresponding re-mapped characters, so as to prevent malware from determining content of the one or more strings. The method can include providing the one or more obfuscated strings to the client computing device, wherein the client computing device is provided with a font definition that causes the re-mapped characters in the obfuscated strings to display visually as the corresponding original characters.

These and other implementations can include one or more of the following features. The method can further include providing the font definition to the client computing device in conjunction with providing the one or more obfuscated strings to the client computing device. Identifying the character map can include generating the character map in response to identifying the one or more strings of text. Identifying the character map can include identifying a particular character map from among one or more character maps that have been obtained prior to identifying the one or more strings of text.

The method can further include repeatedly generating one or more character maps at particular times, and caching the one or more character maps to make the one or more character maps available for use in remapping strings of text for a limited time, wherein identifying the character map comprises identifying the character map from among one or more cached character maps.

The method can further include determining an original font that the one or more strings of text are formatted to be displayed with on the client computing device, the original font comprising a first set of glyphs; identifying a substitute font comprising a second set of glyphs that corresponds to the first set of glyphs from the original font, the second set of glyphs comprising glyphs that are (i) different than glyphs from the first set of glyphs, and (ii) human-discernible as representing the same characters as the glyphs from the first set of glyphs when displayed; and providing the substitute font to the client computing device in conjunction with providing the one or more obfuscated strings to the client computing device so as to cause the client computing device to display the re-mapped characters in the obfuscated strings with the second set of glyphs in the substitute font. The second set of glyphs can be generated by modifying the first set of glyphs.

The method can further include providing, in response to multiple requests for a resource that includes the one or more strings of text from multiple different client computing devices, different substitute fonts to respective ones of the multiple different client computing devices, wherein each of the substitute fonts comprises a particular second set of glyphs that has been modified from the first set of glyphs differently from other second sets of glyphs in other ones of the substitute fonts.

The method can further include identifying different character maps to use in re-mapping the one or more strings of text in response to a plurality of requests for a resource that includes the one or more strings of text; re-mapping the one or more strings of text using respective ones of the identified different character maps so as to produce different obfuscated strings of text for each of the plurality of requests for the resource; and providing the different obfuscated strings of text to corresponding client computing devices that requested the resource.

The method can further include providing, to the client computing device, code that is programmed to cause the client computing device to re-map characters received as user input at the client computing device to different, corresponding characters based on the identified character map. The method can further include identifying the one or more strings of text from web page code. The character map can correlate, for each of one or more first characters, multiple second characters with the first character, such that any one of the multiple second characters can replace, in obfuscated strings of text, the first character from original strings of text.

In some implementations, a computer system for obfuscating text in an electronic document can include an analysis module, a font data repository, a re-coding module, and a data interface. The analysis module is operable to identify strings of text from an electronic document. The font data repository can include one or more character maps that correlate, for each character map in the one or more character maps, a first set of characters with a respective different second set of characters. The re-coding module can generate a re-coded document by re-mapping, using a particular one of the one or more character maps, the identified strings of text into corresponding obfuscated strings of text, and by replacing the identified strings of text with the corresponding obfuscated strings of text from the electronic document. The data interface can transmit the re-coded document to a client computing device.

These and other implementations may include one or more of the following features. The data interface can further be configured to transmit a font definition to the client computing device to cause the obfuscated strings of text to be displayed visually at the client computing device as the identified strings of text. The re-coding module can be configured to re-code the document differently in response to a plurality of requests for the document by re-mapping the identified strings of text using different character maps for each of the requests.

The system can further include an input obfuscation module that is configured to insert program code into the re-coded document to cause the client computing device to re-map characters received as user input at the client computing device to different, corresponding characters based on the particular one of the one or more character maps.

Some implementations include one or more tangible computer-readable storage devices having instructions stored thereon that, when executed by one or more computers, cause performance of operations. The operations can include identifying one or more strings of text to be served to and displayed on a client computing device, the one or more strings of text comprising original characters; identifying a character map that correlates first characters with different second characters; re-mapping the one or more strings of text using the character map so as to produce one or more obfuscated strings ordered by changing the original characters to corresponding re-mapped characters, so as to prevent malware from determining content of the one or more strings; and providing the one or more obfuscated strings to the client computing device, wherein the client computing device is provided with a font definition that causes the re-mapped characters in the obfuscated strings to display visually as the corresponding original characters.

These and other implementations may include one or more of the following features. The operations can further include providing the font definition to the client computing device in conjunction with providing the one or more obfuscated strings to the client computing device. Identifying the character map can include identifying a particular character map from among one or more character maps that have been obtained prior to identifying the one or more strings of text. The operations can further include providing, to the client computing device, code that is programmed to cause the client computing device to re-map characters received as user input at the client computing device to different, corresponding characters based on the identified character map. The character map can correlate, for each of one or more first characters, multiple second characters with the first character, such that any one of the multiple second characters can replace, in obfuscated strings of text, the first character from original strings of text.

BRIEF DESCRIPTION OF THE DRAWINGS

FIGS. 6A-6C show example results of applying a character map to obfuscate a set of strings of text.

Like reference numbers and designations in the various drawings indicate like elements.

DETAILED DESCRIPTION

Figure 1A:
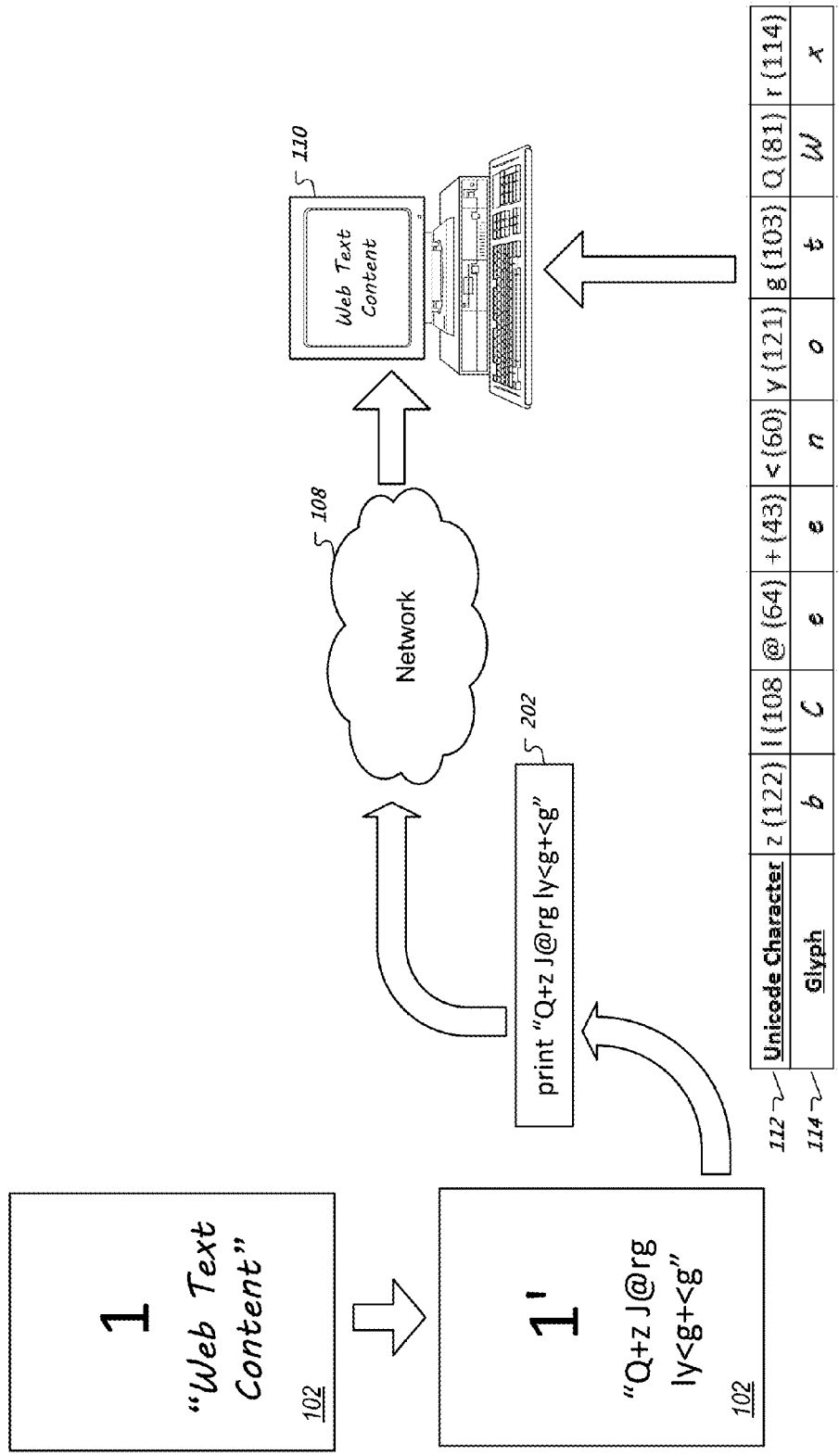
FIG. 1A is a conceptual diagram of an example process for obfuscating text without affecting a visual representation of the text.

This document generally describes techniques for obfuscating text in electronic content. The obfuscation can occur in computer code that defines a document or other content in which the text is defined, without affecting how the text is to be displayed to a user. For example, an HTML document for a web page may include strings of text that are arranged in the HTML code to be displayed on client devices in a presentation of the web page. Using the techniques described herein, the strings of text within the HTML code can be changed from the original strings to obfuscated strings so as to mask the original strings in the HTML code. The visual representations (e.g., glyphs) for characters at particular locations in a character map may be changed in coordination with the how the representations of characters in the code are changed, so that the right characters are actually shown visually. For example, if the HTML code uses the character map position 302 to represent a character that is in position 400 of the normal character map, then the glyph from position 400 may be moved to position 302, so that when the code calls for 302, the correct glyph is shown.

These techniques may be implemented as countermeasures against bots and other software programmed to analyze and exploit electronic content. For example, when a bot attempts to interact with electronic content that has been modified with obfuscated text, the bot may be prevented from understanding the actual meaning of the text. Moreover, computer code with obfuscated text can be executed by a computer without de-obfuscating the text in the computer code, and still generate a presentation of the text that appears equivalent to the original text. This can be achieved in some examples by executing computer code with obfuscated text using a font definition that correlates obfuscated characters with glyphs that visually match original characters. For example, the original string "Hello World" in an HTML file may be obfuscated by substituting the characters in the original string with obfuscated characters to generate the obfuscated string "rnUaas #sM*y." The original characters 'H,', 'e,' 'l,' 'l,' 'o,' 'W,' 'o,' 'r,' 'l,' 'd' are mapped and changed to obfuscated characters 'm,' 'U,' 'a,' 'a,' 's,' '#,' 's,' 'M,' '*,' 'y'; respectively, in the HTML code.

When a browser executes the obfuscated HTML code, the obfuscated string "maaU #bM*y" is caused to be displayed with glyphs that are visually equivalent to "Hello World," because the font definition the system provides to the browser has an inverse substitution of glyphs for positions in a character map that obfuscated the text. Thus, the browser does not de-obfuscate the obfuscated string prior to executing the HTML code. Indeed, the browser actually does parse and display obfuscated characters, even though the obfuscated characters are represented as original text in the presentation of the web page because of the reverse mapping of the glyphs to the codes in the font definition. By not de-obfuscating text at runtime, an additional countermeasure is presented to bots that attempt to interpret the text of web pages or other electronic content on client devices by their font map characterizations. The countermeasures may present an additional layer of security against bots, such as Man in the Browser malware, that compromise endpoints in a manner that enables them to read and interact with content that had been encrypted, but that is decrypted for execution. For example, a banking webpage that includes sensitive account, user identity, and balance information may be transmitted from server to client device over the Internet using a secure connection in which the webpage is encrypted for delivery and decrypted by the client device. Yet, a Man in the Browser bot, for example, that has compromised a client device may reside in a browser with the ability to read and interact with content post-decryption. Accordingly, by using obfuscated text even in the decrypted web code for the banking page, a bot at the infected client device still must overcome the text obfuscation in order to understand the original content of the page. As yet another way to express this concept, the browser in the Hello World example "thinks" it is displaying an "m" when in fact it is displaying an "H" (because it is acting on the text mapped code for "m" and is then simply showing the pixels it was given for that code) and malware that interacts in certain manners will also think the browser is displaying an "m" if it uses the normal character map (e.g., ASCII or Unicode) to interpret the code.

Turning now to FIG. 1A, a conceptual diagram is shown of an example process 100 for obfuscating text without affecting a visual representation of the text. The diagram generally shows a particular piece of electronic content 102 that has text that is obfuscated, and that is transmitted over a network 108 to a client device 110, and executed by the client device 110 using glyphs 114 that are mapped to obfuscated characters 112 (in a reverse manner to how the characters were changed in the code) so as to visually represent the obfuscated text as if it were original text.

Original electronic content 102 is a piece of electronic content that includes one or more strings of text that are arranged to be displayed when the electronic content 102 is executed by a computing device. In some implementations, the electronic content 102 is a web page. The web page may be served to client device 110 over a network 108, such as the Internet, in response to a request from the client device 110. The web page can be defined by one or more pieces of web code such as HTML, JavaScript, and CSS in some examples, although other forms of web code may also or alternatively be provided to generate the overall structure, functionality, content, and appearance of the page. In some implementations, the electronic content 102 may be a plain text document, a structured electronic document, a presentation, a spreadsheet, a portable document format (PDF) document, a rich text formatted document, an e-mail, a short message service (SMS) message, or any other electronic content that includes one or more strings of text that are to be displayed on a client device 110.

As shown in FIG. 1A, the original electronic content 102 may be hosted by a computing system remote from client device 110, but in some implementations the electronic content 102 may be stored locally by the client device 110. In some implementations, obfuscation of the text in the original electronic content 102 may be performed by the computing system remote from client device 110. In some implementations, obfuscation may be performed by the client device 110 or partially by the client device 110 and the remote computing system.

The document labeled "1" represents obfuscated electronic content 104. The obfuscated electronic content 104 includes one or more obfuscated strings of text that are substituted in strings for the original text from original electronic document 102. In some implementations, the obfuscated strings of text are generated by substituting, for each character in the original strings of text, a particular one of one or more obfuscated characters that are mapped to the original character. For example, original electronic content 102 includes the string "Web Text Content." The obfuscated electronic content 104 includes the modified string "Q+z J@rg ly<g+<g." In some implementations, a 1:1 substitution is made between original characters and obfuscated characters. In these implementations, each time a particular original character is encountered, the same obfuscated character code is used to replace that original character. Thus, each "e" in "Web Text Content" can be obfuscated with the character "@" (not shown), by using such changed character in a string of code, or by explicitly using the character code for the obfuscated character (e.g., a numeric value) to represent the character. In some implementations, as shown, a 1:n substitution technique can be used in which multiple obfuscated characters are mapped to each original character. For example, using a one-to-many (1:n) substitution, each "e" character in original text "Web Text Content" can be represented by a unique obfuscation character. Thus, the "e" in "Web" may be changed to "+," whereas the "e" in "Content" may be changed to "@." In some implementations, one-to-many substitution may result in additional protection to electronic content making it more difficult for bots to discern the original text from the obfuscated text.

In other implementations, the particular mapping used may depend on the position of a particular character within a string, e.g., the letter "e" may map to a different glyph when it is the first character in a string as when it is the second character in the string. The tracking of mapping to be applied on a per-position basis in this manner may be managed by JavaScript code that is separately provided to a client device, and may depend on data that is separate from that code, such as by using a function performed by JavaScript code whose performance is changed by a number or other parameter served to the client device (so that a system can vary the manner in which the function is performed by sending such a parameter as a sort of "key" for the function). To even better obfuscate the code, such position-based mapping may change according to a formula that is different for each serving of code, so as to provide additional polymorphism in the code that a piece of malware would have to deal with. The changes in the formula may be effected by the serving of a different parameter code each time, as just described.

The obfuscated text can then be provided to client device 110 for display. If the original text was provided from a computing system remote from client device 110, or the original text was obfuscated remotely, then the obfuscated text may be transmitted to the client device 110 over a network 108.

The client device 110 executes the obfuscated text without changing the underlying obfuscated strings in code, but generates a visual representation of the obfuscated text that is equivalent to the original text. To cause the obfuscated text to be visually represented as the original text, the client device 110 can access a character map 112 that correlates characters in computer code with glyphs that are graphical representations of the characters in the computer code—where such correlation represents a "reverse" or "inverse" of the mapping that occurred to the content before it was served.

The character map 112 can correlate the encoded characters with glyphs in a manner that is inversely related to how the original characters were substituted from original electronic content 102 to the obfuscated characters in obfuscated electronic content 104. For example, to execute a web page that uses Unicode character encoding, the character map 112 can associate each obfuscated character that corresponds to a particular original character with a glyph that graphically represents the particular original character. Accordingly, when the obfuscated characters are displayed by client device 110, the result is a visual representation of the obfuscated characters that is equivalent in appearance to the original text. Thus, even though the client device 110 is caused to print the obfuscated text from electronic document 104 ("Q+z J@rg ly<g+<g"), a user perceives the printed text as if it had not been obfuscated ("Web Text Content"). Such character map 112 can be provided by the server system to the client device 110 along with the other code, or may be accessed by the client device in other manners.

Figure 1B:
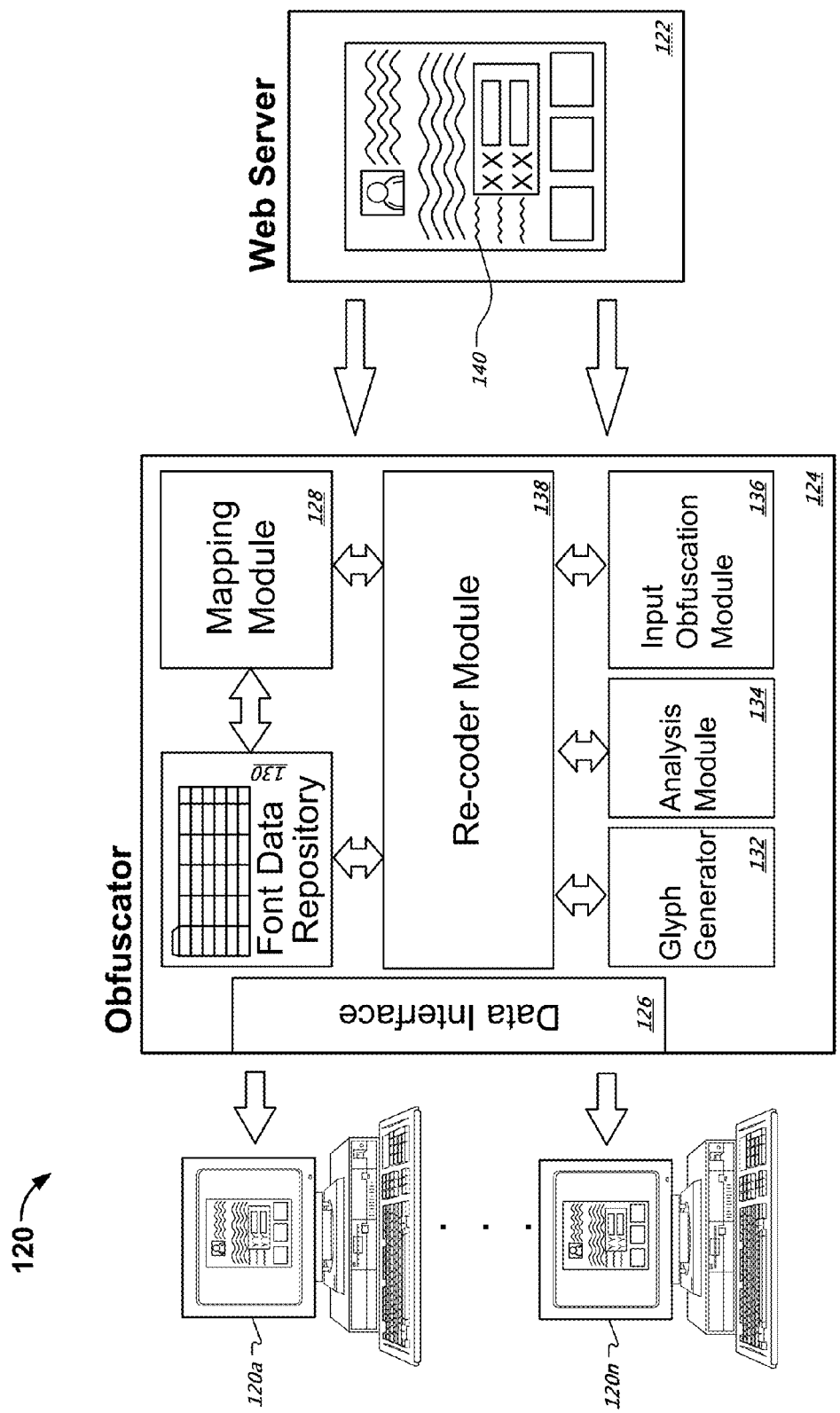
FIG. 1B is a schematic diagram of an example system for obfuscating electronic content.

FIG. 1B is a schematic diagram of an example system 120 for obfuscating electronic content. The system 120 is generally configured to identify one or more strings of text from particular pieces of electronic content and to obfuscate the strings before they are displayed by a client computing device 120. The client device 120 can use glyphs from a special font definition that associates characters with glyphs (in a manner that does not match the normal associate for the corresponding universal font definition) to generate a display of the obfuscated strings that appear like the original strings which the obfuscated strings have encoded. The system 120 can include a web server 122, an obfuscator 124, one or more client computing devices 120a-n, or combinations of these. In some implementations, the system can be configured to perform one or more of the processes described herein.

The web server 122 is a system of one or more computers that makes particular pieces of electronic content accessible to other computers. In some implementations, the web server 122 can receive requests for content from one or more client computing devices 120a-n over a network (e.g., the Internet, a local area network, or a wireless network). The web server 122 can transmit the requested content over the network to the requesting client device 120 in response. In some implementations, the web server 122 may be a cloud computing service that stores files and other data in private accounts for one or more customers and other users. A customer may authenticate with the web server 122 to upload data to the server 122, or to view or download data from the server 122. In some implementations, the web server 122 may host and provide web applications and related data to client devices 120. The web server 122 may host one or more files that can be requested and retrieved by the client devices 120. In some implementations, the web server 122 may include or access scripts and other software to customized content based on one or more parameters associated with a request. For example, the web server 122 may be a search engine that generates search result pages based on a user query. The result pages are generated in response to a request rather than being predetermined. In an example shown in FIG. 1B, the web server hosts a webpage 140 having content in the form of strings of text. The webpage 140 may be transmitted from the web server 122 to a particular one of the client devices 120*a-n* in response to a request. The webpage 140 may be comprised of one or more pieces of code such as HTML, JavaScript, and Cascading Style Sheets ("CSS").

The obfuscator 124 is configured to receive content from the web server 122 and to obfuscate one or more strings of text in the content. In some implementations, the obfuscator 124 can be can be implemented in a computer subsystem that is separate from the web server 122 and the client devices 120*a-n*. For example, the obfuscator 124 may operate as a reverse proxy server that receives and processes traffic from client devices 120*a-n* before forwarding the traffic to the web server 122, and that intercepts traffic originating from the web server 122 before forwarding the traffic to the client device 120*a-n*. In some implementations, the obfuscator 124 may be located on the premises of an operator of the web server 122. In some implementations, the obfuscator can be implemented in a virtual computing environment that shares computer hardware resources with other virtual computers or server software. In some implementations, the obfuscator 124 is included in the web server 122, or may be implemented at the client devices 120*a-n*. The obfuscator 124 can include a data interface 126, a mapping module 128, a font data repository 130, a glyph generator 132, an analysis module 134, an input obfuscation module 136, or particular combinations of one or more of these.

The data interface 126 is configured to receive and transmit data from the obfuscator 124. In some implementations, the data interface 126 interfaces the obfuscator 124 with one or more web servers 122 so that original content from the web server 122 can be received by the obfuscator 124 and so that other traffic obtained from the client devices 120*a-n* can be transmitted to the web server 122. In some implementations, the data interface 126 is operable to transmit data to and receive data from the client devices 120*a-n*.

The mapping module 128 is configured to generate or otherwise obtain character maps for use in obfuscating strings of text. Character maps are generally arranged to map an original set of characters to an obfuscated set of characters. Character maps can be referenced by the obfuscator 124 to generate obfuscated strings of text from original strings of text. For example, a particular character map may map original characters 'a,' 'b; and 'c,' to obfuscated characters 'p,' '^,' and 'Q,' respectively. Accordingly, when this particular character map is used to generate an obfuscated string of text, each original character from the original string of text can be replaced by the obfuscated character specified by the character map (or the numeric code for that character if the text is being referenced in that manner). Thus, the original word "cab" may be obfuscated to "Qp^" using the example character map.

In some implementations, the mapping module 128 can generate character maps that map multiple obfuscated characters to all or some of the original characters. Thus, original character 'a' may be mapped to obfuscated characters '4,' "%,' 'H'; and others, for example. As such, strings of text that include characters which have been mapped to multiple different characters may be obfuscated in more than one way to generate different obfuscated strings that each represent the same original string. Sometimes, the number of unique original characters in a set of strings that are to be obfuscated may be much less than the number of characters that can be provided in a character encoding scheme. The larger number of possible character encodings can be used to map many obfuscated characters to each original character in a character map in some implementations. For example, most content includes strings that have fewer than 256 unique characters. Using an appropriate Unicode character encoding scheme, more than 65,000 different character values can be used. Ignoring reserved character values, each of the 256 unique characters may be mapped to some 256 obfuscated characters.

In some implementations, the mapping module 128 can generate character maps before content from the web server 122 is ready to be obfuscated or before the content has been received. In some implementations, the mapping module 128 can generate character maps that are optimized to particular pieces of content. For example, web page 140 from the web server 122 may be frequently accessed by client devices 120*a-n*. For instance, the web page 140 may be a homepage for a banking website that is the first page the bank's customers access to initiate online banking activities. One or more character maps that are optimized for the homepage can be generated in advance and stored in the font data repository 130, which stores a plurality of character maps that are available to use in obfuscating text.

The optimized character maps for the homepage can be determined using results from the analysis module 134. The analysis module 134 can analyze content received from the web server 122 to identify one or more strings of text to analyze. In some implementations, the analysis module 134 distinguishes between text in the document that is arranged for display and non-displayable text to which character obfuscation should not be applied (e.g., JavaScript functions, HTML tags). The analysis module can identify a set of strings in a document to which obfuscation is to be performed, which may be the set of displayable text in the document. In some implementations, the analysis module can 134 can determine information that characterizes obfuscatable text in the document. The determined information can be used, for example, to generate or identify a particular character map that is suitable or optimized to obfuscate the text. For example, the analysis module 134 can determine whether multiple different character maps should be used to obfuscate different subsets of the strings of text in the original document. The analysis module 134 can also determine a distribution of different characters in a document that are subject to obfuscation. The character distribution can be used by the mapping module 128 to select or generate a character map that is optimal to use in obfuscating particular text. For example, if many instances of a first character occur in a set of text, while relatively few instances of a second character occur in the set of text, then a character map may be determined based on the character distribution that includes more obfuscated characters mapped to the first character than the number of obfuscated characters mapped to the second character.

In some implementations, the mapping module 128 can generate or otherwise identify font definitions that correspond to the character maps. Font definitions can be stored in association with respective character maps in the font data repository 130. A font definition correlates glyphs (graphical representations of characters) with characters so as to cause a client device 120 to display corresponding glyphs when particular characters are displayed by a client device 120. The font definitions may be based on standard font definitions (e.g., TrueType fonts, OpenType fonts, etc.), except that the glyphs are shifted from their normal positions so that obfuscated characters are associated with glyphs for their respective original characters. Thus, when obfuscated text is displayed by a client computing device 120 using a font definition that corresponds to a character map by which the text was obfuscated, the glyphs from the font definition generate a presentation of the obfuscated text that is visually equivalent to original text.

The obfuscator 124 can include a glyph generator 132 in some implementations. The glyph generator 132 can be used to generate custom glyphs for a font definition. In some implementations, the glyph generator 132 can generate glyphs based on existing glyphs from standard or other pre-defined font definitions. For example, particular webpages obtained from the web server 122 may specify that text is to be displayed with an Arial font face. The glyph generator 132 can generate or obtain glyphs that are similar to Arial glyphs but that do not identically match the Arial glyphs. Particular glyphs can be generated by slightly modifying glyphs from a base font face (e.g., Arial glyphs). For instance, one or more pixels may be added, deleted, or translated to a new location in a base font glyph, or one or more vectors in a glyph may be modified. Modified glyphs can be obtained for all or some of the glyphs in a base font, and the modified glyphs can be used in a font definition rather than the original glyphs from the base font. By using modified glyphs to display obfuscated text, a countermeasure is introduced against bots and other nefarious software that attempt to decipher the obfuscated text by analyzing glyphs provided in a font definition in comparison to glyphs in a standard font. The modified glyphs may be human-discernible as representing the same characters as the glyphs from the base font. In some implementations, the analysis module 134 can identify one or more font faces that an original string of text is formatted to be displayed with. The obfuscator 124 can then provide an appropriate font definition to the client devices 120a-n that includes modified glyphs that are determined to be similar to the glyphs in the one or more identified font faces. In some implementations, multiple different sets of modified glyphs can be generated for particular fonts. The modified glyphs can be constantly changed or updated to create a moving target so that when obfuscated text is transmitted to client devices 120a-n, the font definitions provided for displaying the obfuscated text can use different glyphs in response to each of a plurality of different requests.

The input obfuscation module 136 uses one or more character maps identified by the mapping module 128 to obfuscate one or more original strings of text from a document. The re-coder module 138 then re-codes the document by replacing the original strings of text in the document with the obfuscated strings of text, and then provides the re-coded document to data interface 126 for transmission to one or more of the client devices 120a-n.

Figure 2:
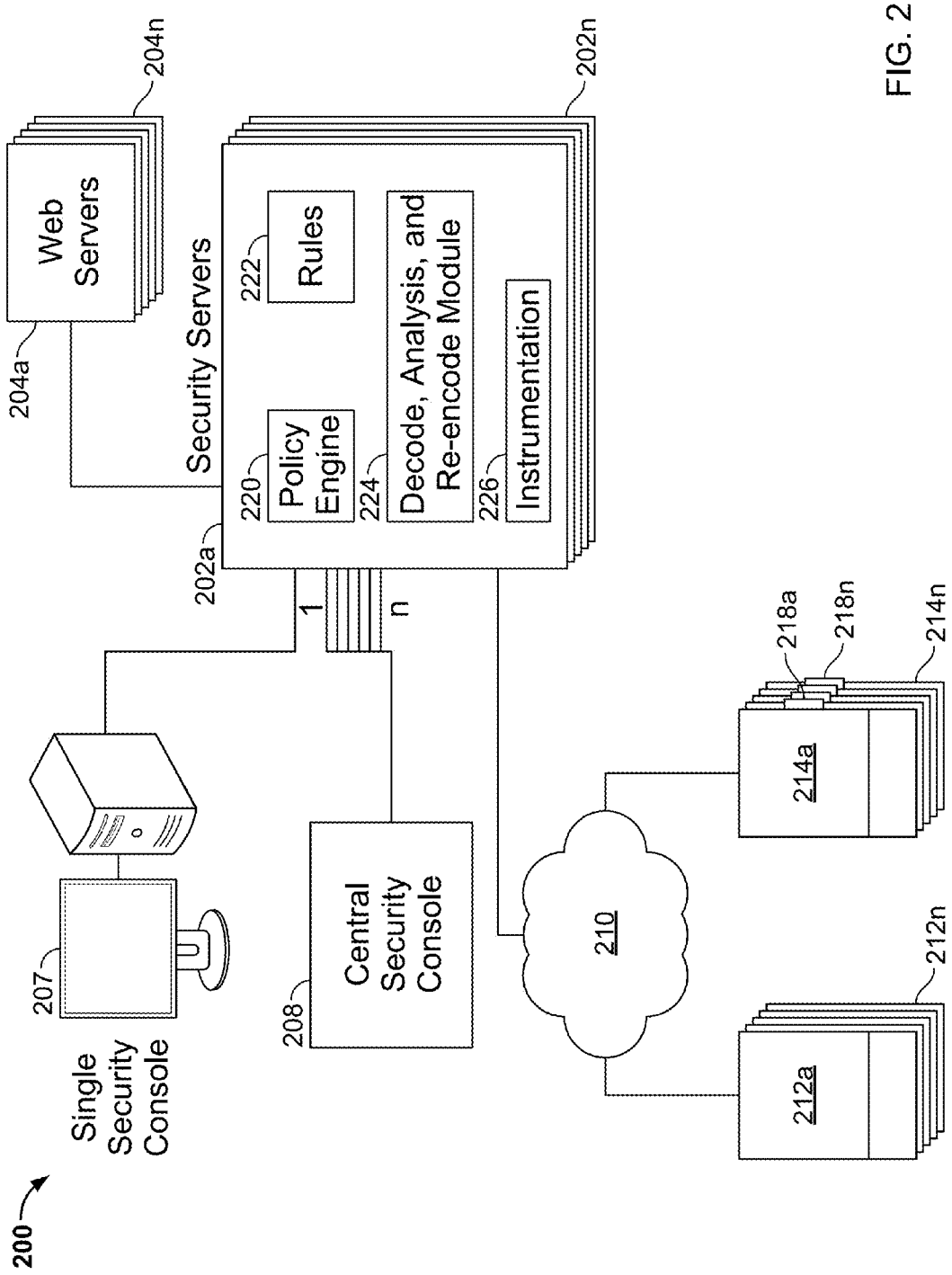
FIG. 2 shows an example system for serving polymorphic and instrumented code.

FIG. 2 shows a system 200 for serving polymorphic and instrumented code. The system 200 may be adapted to perform deflection and detection of malicious activity with respect to a web server system. The system 200 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 204a-204n, and could include a broad array of web servers, content servers, database servers, financial servers, load balancers, and other necessary components (either as physical or virtual servers).

A set of security server systems 202a to 202n are shown connected between the web servers 204a to 204n and a network 210 such as the internet. Although both extend to n in number, the actual number of sub-systems could vary. For example, certain of the customers could install two separate security server systems to serve all of their web server systems (which could be one or more), such as for redundancy purposes. The particular security server systems 202a-202n may be matched to particular ones of the web server systems 204a-204n, or they may be at separate sites, and all of the web servers for various different customers may be provided with services by a single common set of security servers 202a-202n (e.g., when all of the server systems are at a single co-location facility so that bandwidth issues are minimized).

Each of the security server systems 202a-202n may be arranged and programmed to carry out operations like those discussed above and below and other operations. For example, a policy engine 220 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module 224, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 202a-202n, such as by the security servers 202a-202n implementing a web crawler (not shown) like web crawler 162 in FIG. 1 to recursively search for new and changed content and to report such occurrences to the security servers 202a-202n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 222 may store analytical rules for performing such analysis and for re-encoding of the content. The rules engine 222 may be populated with rules developed through operator observation of particular content types, such as by operators of a system studying typical web pages that call JavaScript content and recognizing that a particular method is frequently used in a particular manner. Such observation may result in the rules engine 222 being programmed to identify the method and calls to the method so that they can all be grouped and re-encoded in a consistent and coordinated manner.

The decode, analysis, and re-encode module 224 encodes content being passed to client computers from a web server according to relevant policies and rules. The module 224 also reverse encodes requests from the client computers to the relevant web server or servers. For example, a web page may be served with a particular parameter, and may refer to JavaScript that references that same parameter. The decode, analysis, and re-encode module 224 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 202 along with an identifier for the particular client computer so that the system 202 may know which key or function to apply, and may otherwise maintain a state for the client computer and its session. A stateless approach may also be employed, whereby the system 202 encrypts the state and stores it in a cookie that is saved at the relevant client computer. The client computer may then pass that cookie data back when it passes the information that needs to be decoded back to its original status. With the cookie data, the system 202 may use a private key to decrypt the state information and use that state information in real-time to decode the information from the client computer. Such a stateless implementation may create benefits such as less management overhead for the server system 202 (e.g., for tracking state, for storing state, and for performing clean-up of stored state information as sessions time out or otherwise end) and as a result, higher overall throughput.

The decode, analysis, and re-encode module 224 and the security server system 202 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 224 may be adapted to apply different modifications to each instance of a common web resource, or common portion of a web resource, such that the web code that it is ultimately delivered to the client computers in response to each request for the common web resource includes different modifications.

Such modification may occur according to a process that analyzes the code once for each time it changes in a material way, and then applies the analysis multiple times. For example, elements that can be changed without affecting the presentation of a web page may be located by way of analysis, as may additional instances of those elements through all the code (e.g., HTML, CSS, and JavaScript). A mapping may be made of the types and locations of such elements. Then, each time the code is to be served, the mapping may be used to place random characters or other substitute content in place of each occurrence of each such element. This repeated process may be performed, in certain implementations, with much less computational overhead than would a combined reanalysis and substitution for every serving.

The security server system 202 can apply the modifications in a manner that does not substantially affect a way that the user interacts with the resource, regardless of the different transformations applied, even where different modifications are applied in responding to multiple requests for a common web resource. For example, when two different client computers request a common web page, the security server system 202 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

In some implementations, the decode, analysis, and re-encode module 225 can be configured to identify one or more strings of text in a document and to obfuscate those strings of text before the document is transmitted to a client device. A font definition may also be provided to the client device that is arranged to cause the client device to display obfuscated text with glyphs that are equivalent to the original characters that were substituted for obfuscated characters. Thus, without de-obfuscating the strings of text, the client device uses a particular font definition to generate a display of the obfuscated text that is equivalent to the original text. The decode, analysis, and re-encode module 226 can include obfuscator 124 in FIG. 1B, for example.

An instrumentation module 226 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 202 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 202, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 204a-204n, as encoded by decode, analysis, and re-encode module 224, may be rendered on web browsers of various client computers. Uninfected client computers 212a-212n represent computers that do not have malicious code programmed to interfere with a particular site a user visits or to otherwise perform malicious activity. Infected client computers 214a-214n represent computers that do have malware or malicious code (218a-218n, respectively) programmed to interfere with a particular site a user visits or to otherwise perform malicious activity. In certain implementations, the client computers 212, 214 may also store the encrypted cookies discussed above and pass such cookies back through the network 210. The client computers 212, 214 will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 212, 214. For small-scale analysis, each web site operator may be provided with a single security console 207 that provides analytical tools for a single site or group of sites. For example, the console 207 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 207 may also be multiple different consoles used by different employees of an operator of the system 200, and may be used for pre-analysis of web content before it is served, as part of determining how best to apply polymorphic transformations to the web code. For example, in a combined manual and automatic analysis like that described above, an operator at console 207 may form or apply rules 222 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 208 may connect to a large number of web content providers, and may be run, for example, by an organization that provides the software for operating the security server systems 202a-202n. Such console 208 may access complex analytical and data analysis tools, such as tools that identify clustering of abnormal activities across thousands of client computers and sessions, so that an operator of the console 208 can focus on those clusters in order to diagnose them as malicious or benign, and then take steps to thwart any malicious activity.

In certain other implementations, the console 208 may have access to software for analyzing telemetry data received from a very large number of client computers that execute instrumentation code provided by the system 200. Such data may result from forms being re-written across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 208 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 200, may be blocked from interaction, or may have their operators notified that their computer is potentially running malicious software (e.g., by sending an e-mail to an account holder of a computer so that the malicious software cannot intercept it easily).

Figure 3A:
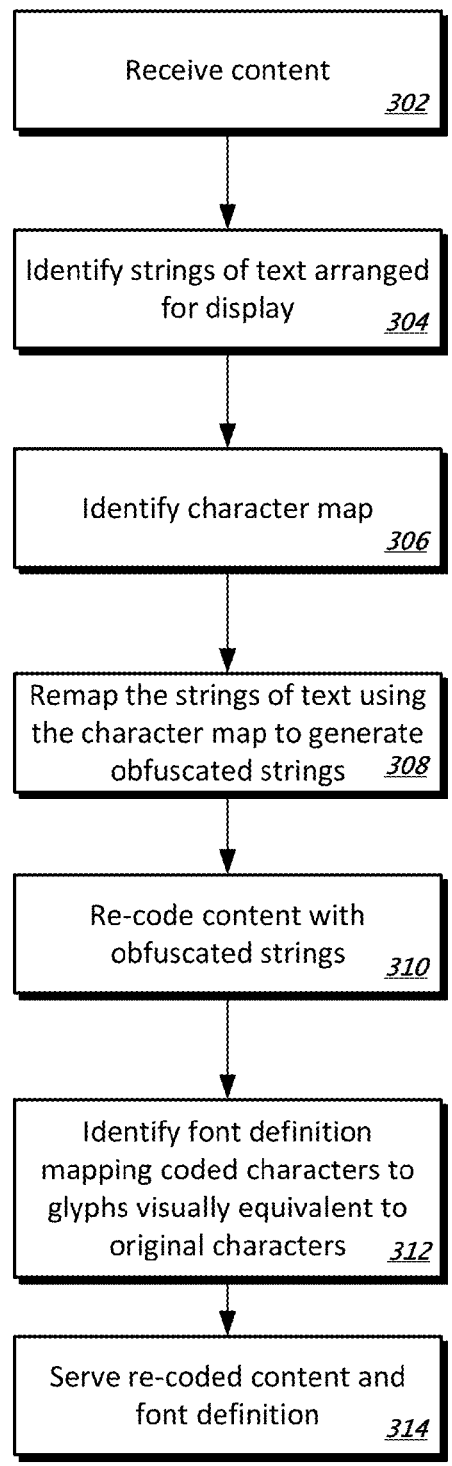
FIG. 3A is a flowchart of an example process for obfuscating text in electronic content and generating a display of the obfuscated text that is substantially equivalent in appearance to the original text before obfuscation.

Referring now to FIG. 3A, a flowchart is shown of an example process for obfuscating text in electronic content and generating a display of the obfuscated text that is substantially equivalent in appearance to the original text before obfuscation. In some implementations, the process may be carried out in conjunction with other processes and techniques described in this document, and may be performed, for example by system 120 depicted in FIG. 1B or system 200 depicted in FIG. 2.

At box 302, the process includes receiving content that includes text arranged to be displayed by a computing device. The content may be an electronic document such as a webpage, a plain text document, PDF, or word processor document. In some implementations, the document may include both text that is arranged for display and other text that indicates a layout, functionality, or stylization for the document and that is not to be displayed. For example, an HTML file for a webpage may include or reference various HTML tags, scripts, or style selectors that instruct a browser to display the webpage in a particular manner. Displayable text, on the other hand, may be located between HTML tags, for example.

The content may be received by an obfuscation engine. In some implementations, the obfuscation engine can be logically located between a server that provides the content and a client device to which the content is to be provided for display. In some implementations, the obfuscation engine intercepts content transmitted between a server and a client device. For example, the obfuscation engine can be implemented within one or more security servers 202 that obtains served content from one or more web servers 204 before the content is served to a client device. By intercepting content from the web servers 204 before the content is ultimately provided to client devices website operators need not implement obfuscation capabilities in the web servers 204 themselves, but can instead rely, for example, on a third-party security operator to provide security servers 202 that have an obfuscation engine that modifies content from the web servers 204 after the content is sent from any of the web servers 204. In certain implementations, however, the obfuscation engine may be provided as one or more software module or other sets of instructions on the web servers themselves so that original content is obfuscated before being served from the web servers 204. In some implementations, the obfuscation engine may be provided as one or more software modules or other sets of instructions on the client device. For example, the client device may include software that obfuscates web pages before the web page is provided to a browser application to be parsed and processed for display.

At box 304, the process includes identifying one or more strings of text in the received content that are arranged for display. In some implementations, such as plain text documents, all of the text in the content may be arranged for display. In some instances, only a portion of text in the received content may be arranged for display. Some content may include both displayable text and other text that indicates how the content is to be executed. For example, a webpage may include HTML tags that define various elements of the page and that indicate how the page is to be presented in a browser, but that are not arranged to be displayed as content of the webpage. Because the HTML tags are comprised of text that is not arranged to be displayed using a character map that can present glyphs for obfuscated text that correspond to the original text, the HTML tags may not be obfuscated in the manner that the displayable text is obfuscated, and may not be obfuscated at all in some implementations. In some implementations, non-displayable text such as HTML tags can be obfuscated using one or more other techniques that add additional security against bots or other alien software.

In some implementations, the process includes discriminating between text that is to be obfuscated and text that is not to be obfuscated. For example, the process may identify particular strings of text that are arranged for display in a document as text that is subject to obfuscation, whereas other strings of text that are not to be displayed may be designated as text that is not subject to obfuscation. In an HTML file, for instance, HTML tags and scripts may be designated as text not subject to obfuscation, whereas textual content that is arranged for display is designated as text that is subject to obfuscation. In some implementations, the division between obfuscatable and non-obfuscatable text may not entirely align with the division between text that is arranged for display and text that is not arranged for display, respectively. For example, sensitive information may be included in commented text included in electronic content. The commented text may be obfuscated even though it will not be displayed.

In some implementations, identifying strings of text that are to be obfuscated can include generating multiple subsets of strings. Strings can be assigned to a particular subset randomly or based on some characteristic or other feature of the string. For example, all strings that are associated with a particular font or style in the original content or that are located within one or more regions of a document may be assigned to a particular subset of strings. In some implementations, the process can apply a different obfuscation scheme to particular ones of the multiple subsets of strings. For example, a first subset of strings may be obfuscated using a first character map that exchanges characters between original and obfuscated text in one manner, whereas a second subset of strings may be obfuscated using a second character map that exchanges characters between original and obfuscated text in a different, second manner. By using multiple obfuscation schemes in a particular piece of electronic content, an additional countermeasure may be introduced against bots that attempt to break obfuscation schemes.

At box 306, the process identifies a character map to use in obfuscating the identified strings of text. Generally, the character map represents a digital representation of a character (e.g., a numeral for a position in the map) to a graphical representation of a character (e.g., as a vector or pixelated image). The character map can map a set of original characters to a set of obfuscated characters. The character map can assign one or more obfuscated characters to each character in the set of original characters. In some implementations, each original character can be mapped to a single obfuscated character. When the obfuscated text is generated, each instance of a particular character that is mapped to a single obfuscated character can be replaced with the single obfuscated character so that all instances of the particular character in the content are replaced with the same obfuscated character. In some implementations, all or some of the original characters can be mapped to multiple obfuscated characters. In these implementations, particular instances of a common original character in the content may be replaced with different obfuscated characters. For example, original character 'a' can sometimes be replaced with obfuscated character 'x' and other times be replaced with obfuscated character "7."

The more diversity that can be achieved among the obfuscated characters for each original character can make it more difficult for bots or other software to de-obfuscate text. Many documents use only a relatively small number of characters relative to the total number of characters available in commonly used character encoding standards. For example, web page code often represents characters by a standard encoding scheme, such as a Unicode standard (e.g., UTF-8). The range of displayable characters in the original web page code may be limited to ASCII characters, which are a set of alphanumeric symbols that can be represented with just one byte of data. However, some characters in the UTF-8 Unicode standard are encoded with up to 4-bytes of data.

Accordingly, most of the available character space is unused in a document. The unused character space can be leveraged by the character map to associate many different obfuscated characters with each original character. In fact, if the original character does not appear in a document more than a defined number of times, a different obfuscated character can be used for each instance of the original character, further thwarting attempts to reconstruct the original text from obfuscated text. For example, assuming that only 256 unique original characters need to be mapped for a given document and that a two-byte (16-bit) encoding is to be used to represent obfuscated characters, then each of the original characters could be mapped to 256 different obfuscated characters (ignoring reserved characters). In some implementations, the obfuscation engine may change the particular character encoding scheme used in a document so that larger sets of obfuscated characters may be used. For example, a document encoded with only ASCII characters may be re-encoded according to the UTF-8 or UTF-16 Unicode standards.

The character map may be generated on the fly or may be pre-generated. For example, one or more different maps may be pre-generated so that they are available when a new request is received to obfuscate one or more strings of text. Each of the character maps may be associated with a font definition that maps encoded characters to glyphs, which can be used by client devices to display the obfuscated text as if it was the original text. In some implementations, a suitable character map may be generated or selected from a plurality of pre-generated character maps based on results of an analysis of the original text that is to be obfuscated. For example, if the original text is determined to be relatively short and to use only a small number of unique characters (e.g., 16-32 characters), then a character map may be selected that maximizes diversity among the obfuscated characters while minimizing the file size of the document with the obfuscated text and the corresponding font definition. For instance, if the original text includes only 32 unique characters in the ASCII space, then a character map may be selected or generated that maps each of the 32 original characters from the original text to 7 different obfuscated characters. In some implementations, complete diversity may be achieved for any of the 32 original characters that are not used in the original text more than 7 times (ignoring reserved characters). In this way, diversity can be achieved even when the obfuscated characters are encoded with just 1 byte.

In some implementations, multiple characters in a set of original characters can be mapped to a common obfuscated character in the character map. This may be done in an effort to counter attempts to reverse engineer the character map by analyzing a corresponding font definition at the client device. For example, if the original characters 'a,' 'b,' and 'c' are each mapped to the obfuscated character '+,' then the corresponding font definition that is used to render a display of the text at the client device can include three different glyphs 'a,' 'b,', and 'c' for the '+' character. Accordingly, it will not be apparent from the font definition which original character ('a,' 'b,' or 'c') is actually being obfuscated with the '+' character. In some implementations, the client device may be provided with data that indicates which of the multiple glyphs to use when the '+' character in encountered in obfuscated text. For example, a key may be provided in conjunction with the font definition or embedded in the document itself indicating which glyph should be displayed. In some implementations, only one of the original characters may actually be obfuscated with the particular obfuscated character that is mapped to multiple original characters. Therefore, there is no loss in the obfuscation and the client device can appropriately display only the glyph corresponding to the one true original character. For example, even though the character map may map original characters 'a,' 'b,' and 'c,' to obfuscated character '+,' only the 'a' character may actually be obfuscated with the '+' character in practice. This may be because 'b' and 'c' are not found in the original text, or because 'b' and 'c' are each mapped to other additional obfuscated characters that are selected to obfuscate the original letters rather than the '+' character.

In some implementations, dummy characters can be mapped to glyphs in a font definition. A dummy character is a character within an obfuscated character set that is not found within obfuscated text. Dummy characters can be mapped to one or more glyphs, the glyphs being mapped to one or more additional characters that are used within the obfuscated text. This measure can further deter bots from identifying correlations between glyphs in a font definition and a set of obfuscated characters. For example, a glyph that portrays the character 'G' can be associated with multiple obfuscated characters in a font definition, e.g., '#,', 'n,' and 'p.' The 'G' glyph may graphically represent obfuscated character '#' where the '#' is used to obfuscate original character 'G.' Thus, 'n' and 'p' may be dummy characters that are not actually used to encode any characters from the original text. In some implementations, the dummy characters may be inserted into a document with obfuscated text so as to counter a bot from determining which characters are dummy characters based on whether the character is or is not used in the obfuscated text. In some implementations, the inserted dummy characters may be hidden or otherwise formatted to not distract from the display of the original content.

At box 308, the process includes remapping the identified strings of original text using the character map to generate obfuscated strings of text. The obfuscated strings can be generated by substituting, for each character in the original text, an obfuscated character that is mapped to the original character in the character map. For example, given a character map that maps original characters 'a,' 'b,' and 'c' to obfuscated characters 'z,' 'h,' and '?,' respectively, the original string "cab" can be obfuscated by character substitution to generate obfuscated string "?zh." Where the character map maps original characters to multiple obfuscated characters, the process can select a particular obfuscated character among the multiple obfuscated characters to substitute for an original character. The particular obfuscated character can be selected randomly from among the multiple obfuscated characters for a given original character.

In some implementations, the particular obfuscated character may be selected so as to maximize diversity among the characters in the obfuscated string of text. For example, the process may analyze the original strings of text that are to obfuscated and determine a number of instances that each original character appears in the original string of text. To the extent possible, different obfuscated characters can be substituted for each instance of a particular original character. For instance, if an original character is mapped to 5 obfuscated characters in the character map, and the original string of text includes 4 instances of the original character, then each instance of the original character can be substituted with a unique obfuscated character. If the original string of text includes 7 instances of the original character, then 2 of the 5 available obfuscated characters may be substituted twice for the original character, for example.

In some implementations, the process can generate or select a character map that is configured to achieve the maximum diversity among characters in a particular string of text. For example, an original string of text may be analyzed to quantify the number of instances of each character in the original string. Based on results of the analysis, a character map can be generated in which the number of obfuscated characters that are mapped to each original character meets or exceeds the determined number of instances of each character in the original string. For example, if an original string of text includes 150 instances of the 's' character, but just 8 instances of 'z,' then a character map can be generated that maps 150 or more obfuscated characters to original character 's,' but just 8 obfuscated characters to original character 'z.' Generally, a character map can be generated in which the distribution of obfuscated characters is proportionate to the number of instances of original characters in one or more original strings of text. The distribution can be determined from analysis of one or more particular strings of text that are to be obfuscated. In some implementations, the distribution can be determined based on an expected distribution of characters that has been determined based on historical analysis of one or more strings of text in a language.

At box 310, the received content is re-coded with the obfuscated strings that were generated at box 308. One or more obfuscated strings can replace one or more original strings, respectively, in the content. In some implementations, only a portion of content may be re-coded with obfuscated strings. The process can insert obfuscated strings at locations in the content that correspond to respective locations at which respective obfuscated strings were inserted. For example, obfuscated strings may replace original textual content in a webpage's HTML code without replacing HTML tags and other information in the code that specifies the page's structure, appearance, or functionality.

At box 312, the process includes identifying a font definition that maps obfuscated characters to glyphs that are visually equivalent to original characters. The font definition can be used by a client device or other computing device to generate a display of obfuscated text in re-coded content that appears as if the obfuscated text was the original text. Each obfuscated character can be associated with a particular glyph that graphically represents the original character to which the obfuscated character is mapped in the font file. The font definition is thus arranged to cause a computing device to generate a de-obfuscated display of one or more strings of obfuscated text without de-obfuscating the underlying strings before being displayed.

In some implementations, a font definition can be identified that is determined to match a font face specified in a document. For example, a webpage may indicate that header text is to be displayed with the "Impact" font face while body text is to be displayed with the "Arial" font face. The process can identify two font definitions for use with the header text and body text, respectively. A header font definition can associate obfuscated characters with glyphs in the "Impact" format, while a body font definition can associate obfuscated characters with glyphs in the "Arial" format. The font definitions may be related in that the associations between the obfuscated characters and the glyphs may be equivalent between the font definitions except for the difference in font face. In some implementations, however, different portions of a document may have been obfuscated with different character substitutions. For example, an original character 'H' in a first portion of a document may be encoded with obfuscated character 'j,' while 'H' in a second portion of a document may be encoded with obfuscated character 'R.' Accordingly, different font definitions can be provided for the different portions of the document corresponding to the respective obfuscation schemes, and a document can be executed with reference to multiple different font definitions.

Font definitions may be provided to client devices in conjunction with the re-coded content that contains obfuscated text. In some implementations, obfuscation is performed remotely from a client device, and the re-coded content is delivered to the client after the one or more strings of obfuscated text have been substituted for the original text in the content. In order for the client device to present the content in a manner that will be understood by users, a font definition that matches the obfuscation applied to the content is made available to the client device. In some implementations, the font definition can be embedded in the content. For example, custom font definitions may be embedded in PDF files so that the embedded font definition is used to display text in the file rather than a font that is stored locally on the client device.

In some implementations, a font definition may be stored on a remote server, and the client device can be provided with an address for the font definition so that the client device is caused to request and separately obtain the font definition. For example, a reference to the remote font definition can be inserted into the code for a re-coded webpage. For instance, CSS code for the webpage can include a font-face selector that identifies one or more font definitions to use with the webpage. If multiple different font definitions are used, the font-face selector can reference each of the multiple font definitions. The font definition may be a Type 1 font, a TrueType font, or an OpenType font, in some examples. Based on an address for one or more font definitions indicated in the web code, a browser at the client device may obtain the font definition and use it to render a display of the web page accordingly. In some implementations, other techniques can be used to display appropriate glyphs from the font definition. Some of these include image replacement in which graphics (e.g., GIF, JPEG, BMP, PNG files) represent the glyphs in a font definition.

In some implementations, the font definitions include sets of glyphs that are similar, but not identical, to glyphs for a font face in which the original strings of text were formatted to be displayed. For example, the process can determine that text in a webpage is formatted to be displayed in Times New Roman font face. Accordingly, the glyphs in the font definition can be Times New Roman glyphs or other glyphs that appear similar to Times New Roman glyphs but that are not exactly the same. In some implementations, the other glyphs may be modified versions of the Times New Roman glyphs that change particular vectors, pixels, kerning, or other typographical aspects in the original Times New Roman glyphs but that are still perceived by users as representing the same characters as the original glyphs. The process may carry out operations of the glyph generator 132 of FIG. 1B in some examples.

At box 314, the process includes serving re-coded content to a client device. The re-coded content may include one or more obfuscated strings of text that have been generated and replaced one or more original strings of text. In some implementations, the re-coded content can be served in response to a request from a client device. The re-coded content can originate from the web server that hosts the original content. In some implementations, the re-coded content can originate from a separate obfuscation system that has intercepted original content from a web server and re-coded the content before providing the content to a client device. The re-coded content may be served with a font definition that is usable to legibly display obfuscated text in the content, or font definitions may be obtained by a client device in other ways (e.g., by inclusion of a font definition address in the re-coded content).

Figure 3B:
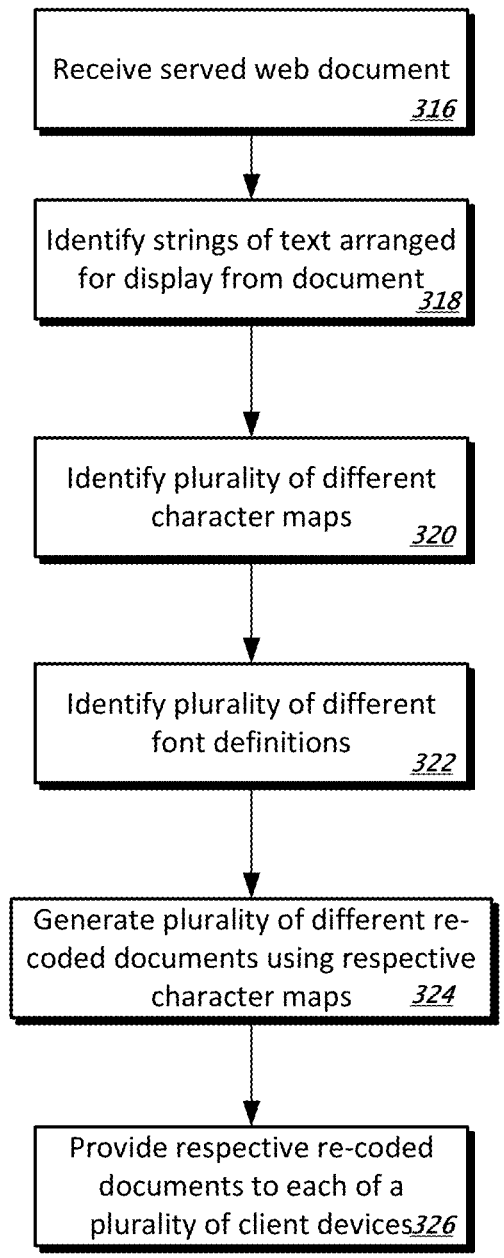
FIG. 3B is a flow chart of an example process for polymorphic obfuscation of text in a document.

Turning to FIG. 3B, an example process is depicted for polymorphic obfuscation of text in a document. The techniques described with respect to FIG. 3A and throughout this document can be used in this process to obfuscate one or more strings of text and to identify a corresponding font definition for displaying the obfuscated text with glyphs that are visually equivalent to the original text. Additionally, the example process of FIG. 3B shows how text may be obfuscated differently each time it is served so as to prevent bots from determining obfuscation patterns across multiple sessions or across multiple client devices. Thus, a bot may not know what obfuscations to expect when a document is served to a client device.

At box 316, a web document is received. Although this process is discussed with respect to a web document (e.g., a webpage) in this example, the techniques can also be applied to other forms of electronic content such as word processor documents, application content and electronic messages. In some implementations, the document may be received by an obfuscation intermediary that is situated between a server that hosts the original document and a client device to which the document is ultimately to be served. The obfuscation intermediary may be executed at a server subsystem that intercepts traffic between client devices and a web server. The obfuscation intermediary may act as a reverse proxy server that is generally transparent to a web server so that the web server serves code for a web document in an original form without performing obfuscations itself. The obfuscation intermediary obfuscates original text in the served code before forwarding a re-coded document with obfuscated text to a client device. Similarly, the obfuscation intermediary can receive requests from the client devices that are addressed for the web server. The requests may be generated by the client devices based on obfuscated text. Accordingly, the obfuscation intermediary can de-obfuscate information in the requests from the client devices before forwarding the requests to the web server.

At box 318, the process identifies strings of text that are arranged for display in the document. In some implementations, the process distinguishes text in document code (e.g. HTML code) that is arranged for display from other text that is not arranged for display (e.g., HTML tags, JavaScript functions). The document in this example process can be a particular document that has been commonly requested by multiple client devices and across multiple computing sessions. The document can be re-coded differently in response to each request for the document. For efficiency, the document can be pre-analyzed or the results of an analysis of the document can be saved for later use so that, for example, the document does not need to be re-analyzed in response to each request. For example, the document may be analyzed to determine which strings of text are arranged for display, their locations within the document, and information about a distribution of characters used in the document. The results of the analysis can be used to identify or generate one or more suitable character maps to use in obfuscating the strings of text in the document. However, by caching and reusing the results of one or more prior analyses of a document, the process can reduce the latency involved in obfuscating a served document.

At box 320, character maps are identified for obfuscating one or more strings of text in the document. Different character maps can be identified for each instance of the document that is to be served to a client device. The process can thus apply polymorphic obfuscations to a document using the different character maps so that the document is re-coded with different obfuscated strings for each a plurality of times that the document is served. For example, a first character map may map original character 'v' to the set of obfuscated characters 'n,' '$,' 'J,' and '*.' A second character map may map the 'v' character to obfuscated characters 'b,' '4,' '^,' and 'Q.' Additional character maps can be identified that map characters differently among each other. At box 322, corresponding font definitions can be determined that are configured to display text that has been obfuscated with a respective character map with a presentation that is visually equivalent to the original text. Different font definitions may be identified that correspond to the different character maps, respectively.

At box 324, the process generates a plurality of different re-coded documents using the different character maps. For example, a first re-coded version of the document may be generated for a first request from a first client device in a first session. A second re-coded version of the document may be generated for a second request from the first client device in a second session. A third re-coded version of the document may be generated for a third request from a different, second client device. Each of the first, second, and third versions of the re-coded document can be generated by obfuscating displayable text in the document using a different character map. For instance, a string of text in the original document that read "Hello World" can be obfuscated to "ta*7H poiK!" in the first version, "nVtr@+−Q#m" in the second version, and "<o&yQ NCx~I" in the third version of the document. In some implementations, different randomly generated character maps can be applied to obfuscate text in the document for each instance of the document that is to be served to a client device. The randomness in how the character maps were generated can be used to produce different obfuscations among each instance of the document that is re-coded and provided to a respective client device.

At box 326, the process provides a respective version of the re-coded document each of the client devices that requested the document. The re-coded documents can be provided along with respective font definitions that correspond to how text in the document was obfuscated. In some implementations, such as where the obfuscation intermediary between a web server and the client devices obfuscates text and re-codes the document, information regarding the obfuscations can be retained so that data from the client devices can be de-obfuscated and forwarded to the web server. For example, the obfuscation intermediary may store information that identifies the character map that was used to generate each version of the re-coded document. In some implementations, the character map can be encrypted and provided in one or more cookies to a client device in connection with serving the re-coded document. When further requests are received from the client device in association with the re-coded document, information from the cookie (e.g., the character map) can be included and used by the obfuscation intermediary to de-obfuscate content in the request.

Figure 3C:
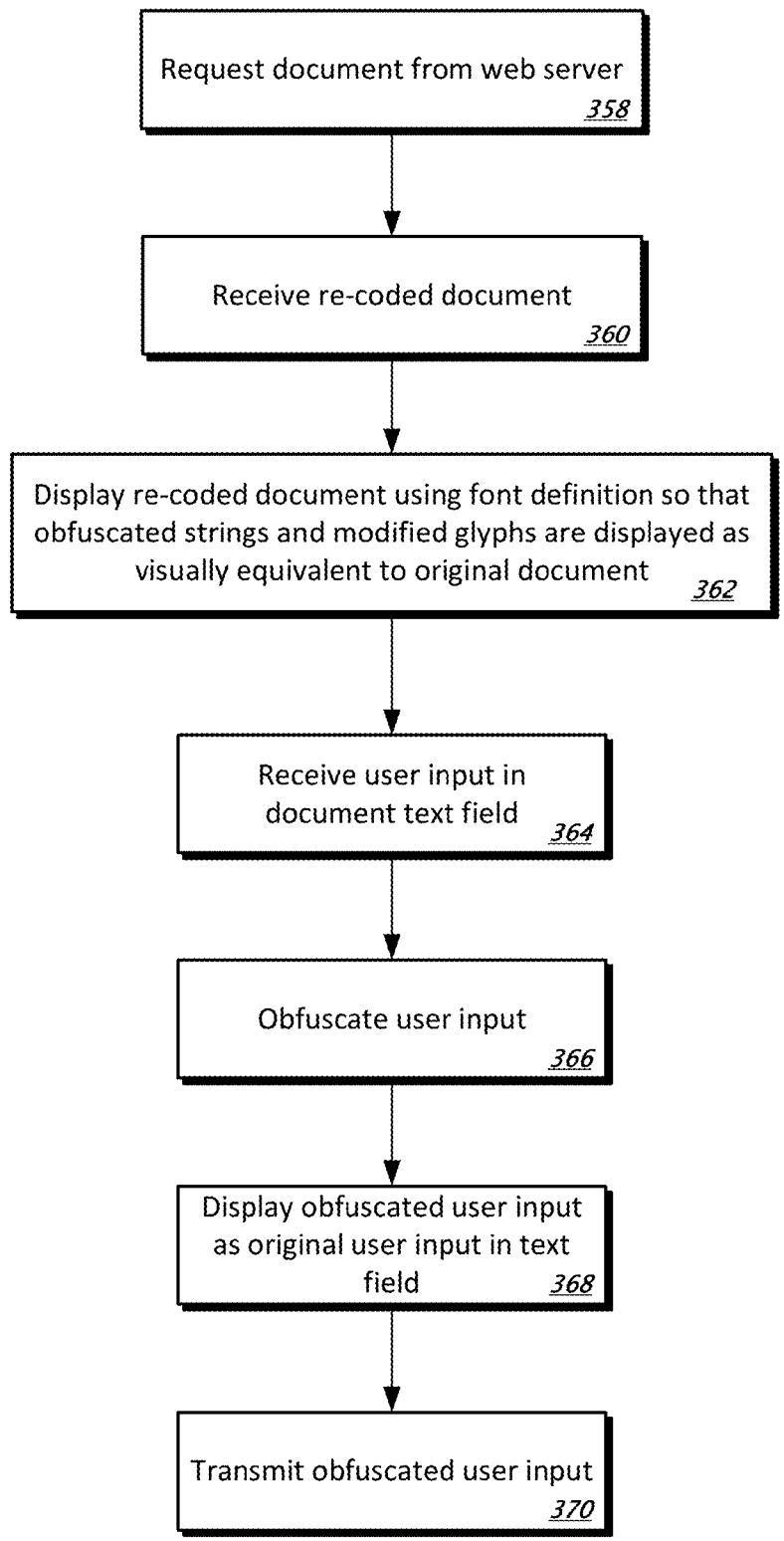
FIG. 3C is a flowchart of an example process for obfuscating user input in a document.
Figure 4:
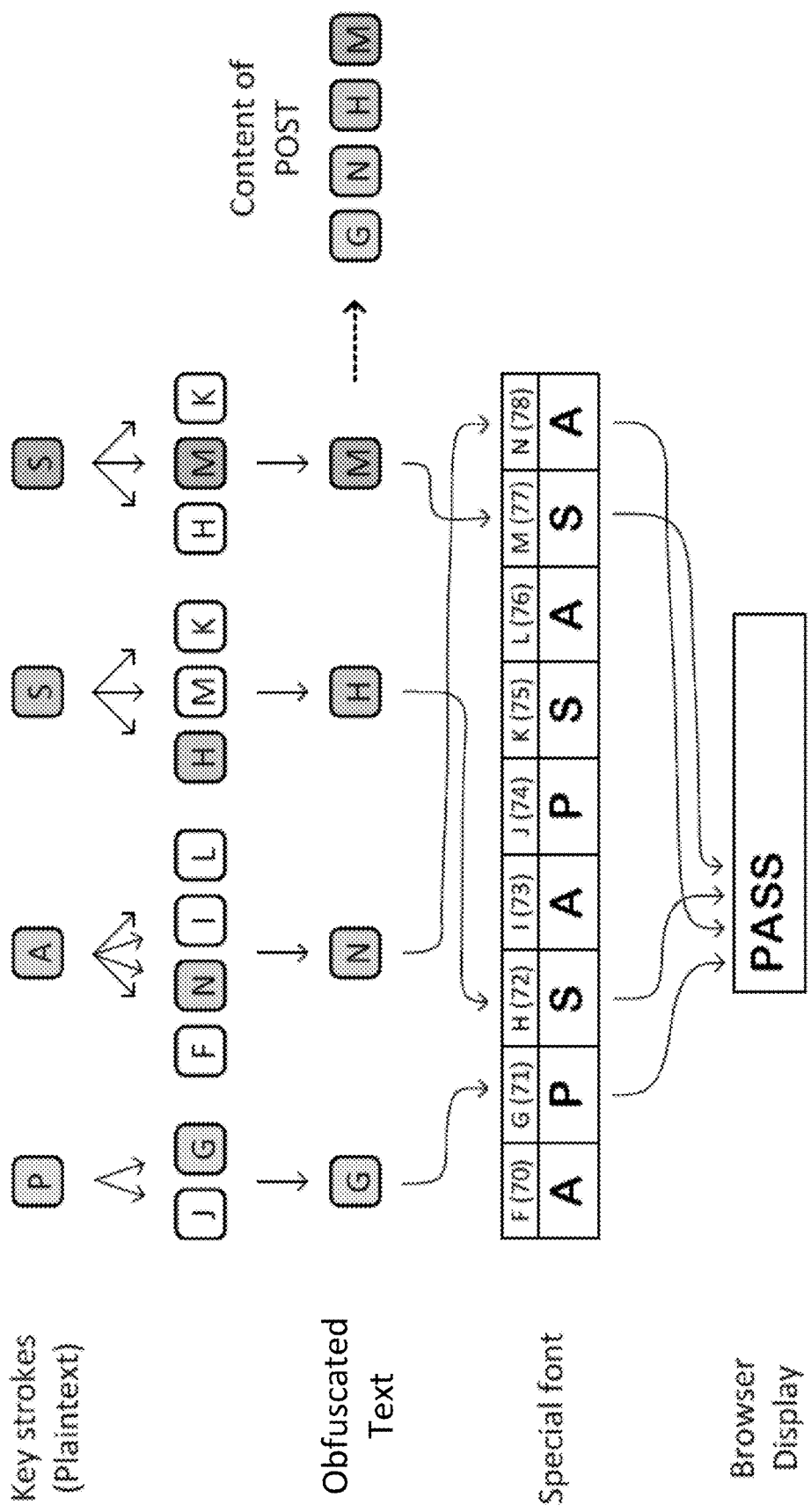
FIG. 4 is a conceptual diagram of an example process of obfuscating user input in a document.

FIG. 3C is a flowchart of an example process for obfuscating user input in a document. Some documents include fields that are configured to receive one or more strings of text from user input. User-entered text may be saved in a document in some implementations, or may be submitted from the document for remote processing. For example, a webpage may include one or more forms that use text input fields to accept information from a user. Once data is entered into HTML forms for the webpage, the names and values of the input field elements can be encoded and sent to a server in an HTTP request message using GET or POST methods. As a countermeasure against bots or other software that may attempt to read data from input field elements, user entered text may be obfuscated so that obfuscated text, rather than the original text entered by the user, is saved in the document and/or submitted to a server. One example of these techniques is shown in FIG. 4, which will be referred to in the description of the process of FIG. 3C.

At box 358, a client device requests a document (e.g. a webpage) from a web server, which can be remote from the client device. For example, a user of the client device may select a hyperlink or enter a web address in a browser that causes the browser to send an HTTP request for a webpage indicated by the hyperlink or entered web address. The client device may then receive, at box 360, a document that has been re-coded with obfuscated text in response to the request. The re-coded document may have been generated using the techniques described throughout this paper. The client device may also receive a font definition file that maps the obfuscated characters in the document to glyphs that will be displayed as representations of the obfuscated characters. The respective glyphs for particular ones of the obfuscated characters can be visually equivalent to an original character that the obfuscated character has replaced in the document.

In some implementations, the font definition may be embedded in the re-coded document or may be received along with the re-coded document in response to a particular request. In some implementations, the client device may parse the re-coded document and identify an address from which the font definition can be obtained. For example, a browser may identify a font-face CSS selector in web code for a re-coded document that instructs the browser to send another request to obtain the font definition.

At box 362, the re-coded document is displayed by the client device using one or more specified font definitions so that obfuscated strings of text in the re-coded document are displayed as if they were the original strings of text. The re-coded document may include one or more input field elements in which users can enter text, such as form field elements in a webpage.

At box 364, user input is received in one of the input field elements in the display of the re-coded document. In some implementations, a user may type characters into an input field through a physical or virtual keyboard that is operably coupled to the client device from which the document is being displayed. In some implementations, the input may be provided as spoken input which is transcribed to text and automatically entered into a field. Text can also be pasted into an input element or entered by other means. For example, as shown in the example of FIG. 4, a user enters keystrokes for the characters 'P,' 'A,' 'S,' 'S.' For instance, the user may intend to enter the word "PASS," and accordingly make strike keys on a keyboard corresponding to the characters in "PASS."

At box 366, the user input is obfuscated. In some implementations, input can be obfuscated even before the input is provided to an input field element. The input may be obfuscated as each character is entered in some implementations, or the process may delay obfuscating input until a threshold amount of information (e.g., a predetermined number of characters) has been entered. If obfuscation is delayed, the entered characters may be stored in a secure buffer before the characters are provided to the input field. In some implementations, a script or other program that is configured to obfuscate user input can be executed in conjunction with the re-coded document. For example, a JavaScript program may be provided with a re-coded webpage. When input is determined to be directed to an input field on the re-coded webpage, the JavaScript program can identify a respective original character corresponding to each of the keystrokes, and change the original characters to obfuscated characters. The original characters can be changed to obfuscated characters using a predetermined character map in a similar manner to how strings of text in the re-coded document were obfuscated. The character map for the characters received through user input at the client device may assign one or more obfuscated characters to each of a set of original characters.

The character map for translating user input characters to obfuscated characters may be obtained by the client device from a computer system remote from the client device in some implementations. For example, the character map may be provided to the client device in connection with the re-coded document being provided to the client device. The character map may be encrypted to prevent any bots that may have comprised the client device from being able to read the character map. In some implementations, the character map may be stored remotely from the client device rather than being served to the client. In these implementations, data indicative of characters received from user input may be securely transmitted to the remote system with a request for a suitable obfuscated character for each of the inputted characters. For example, a re-coded webpage may be provided with code for making asynchronous requests to a server for respective obfuscated characters to replace one or more original characters as characters are entered into an input field element on the page. The server can then determine a character map associated with the request, identify an obfuscated character using the character map, and send information to the client device that identifies the obfuscated character to use. Once an obfuscated character is determined, the obfuscated character, rather than the original character entered by the user, can be entered into the input field element. The character map for obfuscating user input may be the same or different than one or more other character maps that were used to obfuscate one or more strings of text of content in a document. In some implementations, a character map may not be predetermined before a re-coded document is served to a client device. For example, a document can be re-coded so as to include JavaScript or other executable code that is configured to generate a character map at the client device. In this example, the client may use the included code to randomly determine characters to substitute for each user-inputted character without a predetermined character map generated by the server. If the obfuscated input is transmitted to a server, the transmission can include an encrypted key that includes information usable by the server to de-obfuscate the input characters.

One example of obfuscating user input characters is shown in FIG. 4. Upon receiving the sequence of keystrokes for original user input characters 'P,' 'A,' '5,' 'S,' executable code on the client device responds by identifying respective obfuscated characters to substitute for each original character. The characters can be obfuscated before being provided to an input field element in the document. In some implementations, the client device may identify a character map to use in determining particular characters that are available to obfuscate a given original input character. For example, as shown in FIG. 4, two characters, 'J' and 'G' are assigned to original input character 'P.' Similarly, four different characters, 'F,' 'N,' 'I,' and 'L,' are designated as being available to obfuscate input character 'A,' and three different characters, 'H,' 'M,' and 'K,' are assigned to original character 'S.' For each of the original input characters, a particular one of the assigned characters can be selected to substitute in for the original character in the obfuscated input string. In some implementations, executable code provided with a re-coded document on the client device can select which of the available characters to use in obfuscating the original characters. For example, in FIG. 4, the shaded characters 'G,' 'N,' 'H,' and 'M' are selected to obfuscate the characters 'P,' 'A,' 'S,' and 'S,' respectively.

In some implementations, the obfuscated set of characters can be selected among the available characters randomly. In some implementations, the selections can be made to maximize diversity among the obfuscated characters. Thus, if multiple instances of an original input character are received, different characters may be selected to obfuscate each instance of the original input character to the extent possible. For example, the input string "PASS" includes two 'S' characters, and a set of three possible obfuscation characters are assigned to original character 'S.' 'H' is selected to obfuscate the first 'S' instance. Accordingly, to maximize diversity, 'M' and 'K' can be preferred to the exclusion of 'H' to obfuscate the second 'S' instance. Thus, the obfuscated input includes two different characters that correspond to the letter 'S,' making it more difficult for bots to discern the original characters from the obfuscated input. The obfuscated input can be provided to an appropriate input field element in a webpage or other document. If the value of the input field element is submitted to a server using, for example, a GET or POST method, the submitted value is obfuscated rather than original input.

At box 368, the obfuscated user input is displayed as the original user input in the input field element. Obfuscated characters are displayed in the input field rather than the original characters. However, the obfuscated characters are displayed using a font definition that matches each obfuscated character to a glyph that visually represents the associated original character. The effect is that, using the font definition, the display of the obfuscated text appears as if the original text was being displayed. But the underlying value of the input field element is the obfuscated text, rather than the original text corresponding to the keystrokes entered by the user. Thus, in FIG. 4, the display of obfuscated string "GNHM," appears in the browser like the original input, "PASS." As noted above, at box 370, either automatically or in response to a user command, the text values of one or more input field elements can be transmitted to a server remote from the client device. The transmission can include the obfuscated text rather than original user input text.

Figure 5A:
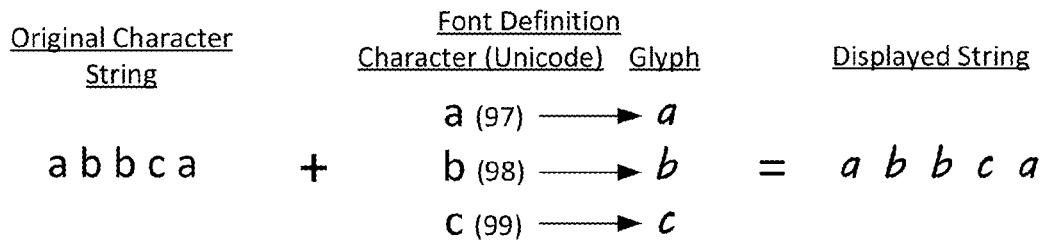
FIG. 5A shows a display of an original character string without obfuscation.
Figure 5B:
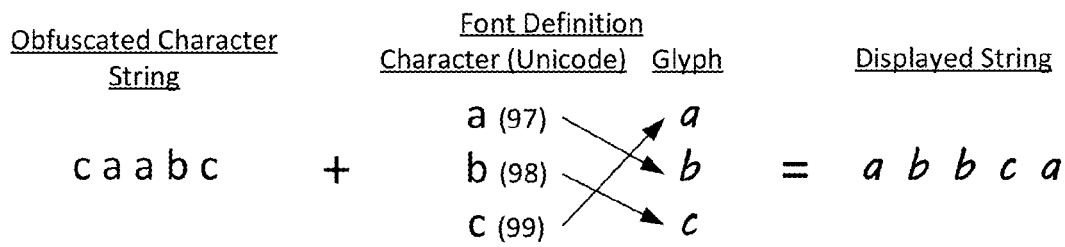
FIG. 5B shows an obfuscated string of text in which a first shifted font definition is used to display a de-obfuscated representation of the obfuscated text.
Figure 5C:
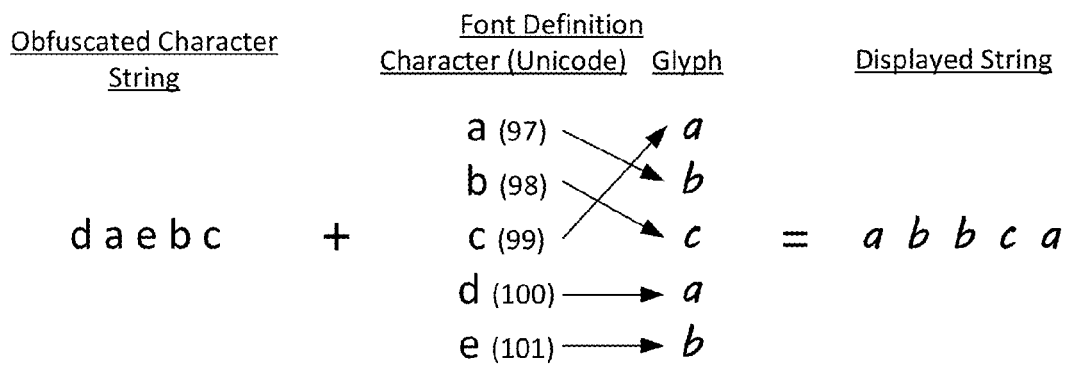
FIG. 5C shows an obfuscated string of text in which a second shifted font definition is used to display a de-obfuscated representation of the obfuscated text.

FIGS. 5A-5C show particular examples of how a font definition (file) can be used to generate equivalent displays of a character string given differently coded character strings.

FIG. 5A shows an original character string that is displayed normally, i.e., without obfuscation or remapped glyphs in the font definition. On the left, the character string "abbca" is provided for display. This string may be original text that is to be displayed in a document. A standard font definition is used to display the string. For example, the font definition shows that the Unicode value for each character in the string is mapped to a glyph that graphically represents the standard character associated with the Unicode value. In other words, the glyphs in the font definition in FIG. 5A have not been shifted from their standard positions to be re-mapped to other Unicode values. The result is that the displayed string, "abbca," is equivalent to the original string, "abbca."

FIG. 5B shows an obfuscated string of text in which a first shifted font definition is used to display a de-obfuscated representation of the obfuscated text. Here, the original string of text "abbca" has been obfuscated to "caabc" using a one-to-one substitution in which each original character is mapped to a single obfuscated character. The relationships between the original characters and obfuscated characters in this example are shown in the first shifted font definition, which corresponds to a character map that was used to generate the obfuscated string of text. Original character 'a' is mapped to obfuscated character 'c,' original character 'b' is mapped to obfuscated character 'a,' and original character 'c' is mapped to obfuscated character 'b.' The result of displaying the obfuscated string "caabc" with the first shifted font definition is that the displayed string is visually equivalent to original string "abbca."

FIG. 5C shows an obfuscated string of text in which a second shifted font definition is used to display a de-obfuscated representation of the obfuscated text. In this example, the original string of text "abbca" has been obfuscated to "daebc" using a one-to-many substitution in which all or some of the original characters are mapped to multiple obfuscated characters. The relationships between the original characters and obfuscated characters in this example are shown in the second shifted font definition, which corresponds to a character map that was used to generate the obfuscated string of text. Original character 'a' is mapped to obfuscated characters 'c' and 'd,' original character 'b' is mapped to obfuscated characters 'a' and 'e,' and original character 'c' is mapped to obfuscated character 'b.' As such, the obfuscated character string includes a greater diversity of obfuscated characters, and multiple instances of the same original character can be obfuscated with different characters. The second shifted font definition maps the obfuscated set of characters to a set of glyphs in a manner that causes the obfuscated string to be displayed as the original string of text when perceived by a user.

FIGS. 6A-6C collectively show the results of applying a character map to obfuscate a set of strings. FIG. 6A shows an example of a partial character map and a related font definition. A set of original characters are shown, along with their Unicode values and an obfuscated character that is mapped to each original character. The glyph corresponding to the original and obfuscated character is also shown in the fourth row of the table. FIG. 6B shows the original set of strings to which the character map is applied. FIG. 6C shows the results of obfuscating the original set of strings with the character map of FIG. 6A.

Figure 7:
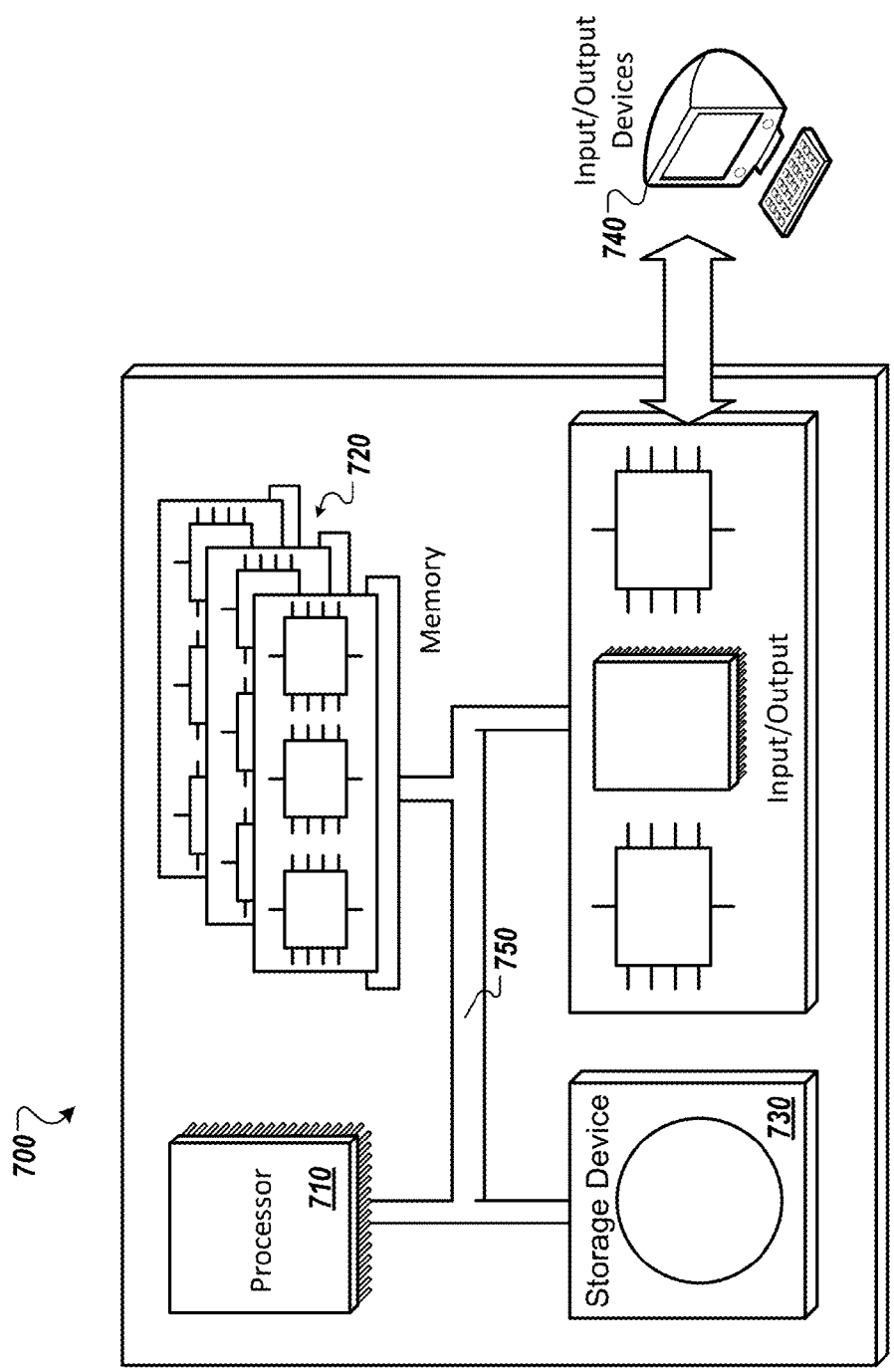
FIG. 7 is a block diagram of a generic computer system for implementing the processes and systems described herein.

FIG. 7 is a schematic diagram of a computer system 700. The system 700 can be used for the operations described in association with any of the computer-implemented methods described previously, according to one implementation. The system 700 is intended to include various forms of digital computers, such as laptops, desktops, workstations, personal digital assistants, servers, blade servers, mainframes, and other appropriate computers. The system 700 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 400. In one implementation, the storage device 730 is a computer-readable medium. In various different implementations, the storage device 730 may be a floppy disk device, a hard disk device, an optical disk device, or a tape device.

The input/output device 740 provides input/output operations for the system 400. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, at an intermediary computing system and from a web server system that is separate from the intermediary computing system, a textual string that is to be served over a network to a client computing device;
determining, at the intermediary computing system, an obfuscated font map that is to be applied by the client computing device, wherein the obfuscated font map identifies a set of character exchanges that map character positions to glyphs that do not visually match characters at the character positions;
converting the textual string, at the intermediary computing system, by exchanging characters in the textual string with substitute characters, the converting corresponding to character exchanges that are identified in the obfuscated font map, and made so that presentation of the textual string with a normal font map will display unrecognizable text that does not match the textual string, wherein the normal font map maps character positions to glyphs that visually match characters at the character positions; and
providing, by the intermediary computing system, the converted textual string to the client computing device for display on the client computing device using the obfuscated font map so as to present the converted textual string as text that renders visually as the identified textual string before the converting.

2. The computer-implemented method of claim 1, further comprising providing, by the intermediary computing system, the obfuscated font map to the client computing device in conjunction with providing the converted textual string to the client computing device.

3. The computer-implemented method of claim 1, further comprising generating, by the intermediary computing system, the obfuscated font map.

4. The computer-implemented method of claim 1, wherein the intermediary computing system identifies the textual string from code for a first web page as text that is arranged for display in a presentation of the first web page.

5. The computer-implemented method of claim 4, further comprising:
identifying, by the intermediary computing system, that the first web page is to be served to each of a plurality of client computing devices;
determining multiple obfuscated font maps that are to be applied by respective ones of the plurality of client computing devices, wherein each of the multiple obfuscated font maps identifies a respective set of character exchanges that map character positions to glyphs that do not visually match characters at the character positions, wherein the respective sets of character exchanges among at least some of the multiple obfuscated font maps are different from each other;
converting, for each of the multiple obfuscated font maps, the identified textual string by exchanging characters in the textual string with substitute characters, the converting corresponding to character exchanges that are identified in the respective one of the multiple obfuscated font maps; and
providing the converted textual strings in respective versions of the first web page to the plurality of client computing devices.

6. The computer-implemented method of claim 1, wherein the intermediary computing system comprises a proxy server.

7. A computer-implemented method, comprising:
identifying, at an intermediary computing system that processes various content from a web server system before the various content is served over a network to various client computing devices, one or more original strings of text that are to be served to and displayed on a first client computing device, the one or more original strings of text comprising original characters;
identifying, at the intermediary computing system, a character map that correlates first characters with different second characters;
re-mapping the one or more original strings of text using the character map so as to produce one or more obfuscated strings of text, wherein the re-mapping includes substituting, according to the correlations indicated by the character map, each respective original character in the one or more strings of text for a respective obfuscated character; and
providing the one or more obfuscated strings of text to the first client computing device along with code for causing the first client computing device to render the one or more obfuscated strings of text for display using a font definition that maps character positions to glyphs that do not visually match characters at the character positions, such that the one or more obfuscated strings of text will render visually as the one or more original strings of text.

8. The computer-implemented method of claim 7, further comprising providing, from the intermediary computing system, the font definition to the first client computing device in conjunction with providing the one or more obfuscated strings to the first client computing device.

9. The computer-implemented method of claim 7, comprising generating the character map in response to identifying the one or more original strings of text.

10. The computer-implemented method of claim 7, wherein identifying the character map comprises selecting the character map from among one or more character maps that were obtained prior to identifying the one or more original strings of text.

11. The computer-implemented method of claim 7, further comprising repeatedly generating one or more character maps at particular times, and caching the one or more character maps to make the one or more character maps available for use in remapping strings of text for a limited time, wherein identifying the character map comprises selecting the character map from among one or more cached character maps.

12. The computer-implemented method of claim 7, further comprising:
determining an original font that the one or more original strings of text are formatted to be displayed with on the first client computing device, the original font comprising a first set of glyphs for displaying characters according to a first style;
identifying a substitute font comprising a second set of glyphs for displaying characters according to a second style, wherein respective glyphs for the same characters from the first set of glyphs and the second set of glyphs are human-discernible as depicting the same characters when displayed; and providing the substitute font to the first client computing device in conjunction with providing the one or more obfuscated strings of text to the first client computing device, so as to cause the first client computing device to display the respective obfuscated characters in the obfuscated strings of text with the second set of glyphs from the substitute font.

13. The computer-implemented method of claim 12, comprising modifying the first set of glyphs to generate the second set of glyphs.

14. The computer-implemented method of claim 13, further comprising providing, in response to identifying respective requests from a plurality of client computing devices, different ones of a plurality of substitute fonts to respective ones of the plurality of client computing devices, wherein each of the plurality of substitute fonts comprises a respective second set of glyphs that has been modified from the first set of glyphs differently from other second sets of glyphs from other ones of the substitute fonts.

15. The computer-implemented method of claim 7, further comprising:
identifying different character maps to use in re-mapping the one or more original strings of text in response to a plurality of requests for a resource that includes the one or more original strings of text;
re-mapping the one or more original strings of text using respective ones of the identified different character maps so as to produce different obfuscated strings of text for each of the plurality of requests for the resource; and
providing the different obfuscated strings of text to corresponding client computing devices that requested the resource.

16. The computer-implemented method of claim 7, further comprising providing, to the first client computing device, code that is programmed to cause the first client computing device to re-map characters received as user input at the first client computing device to different characters according to the correlations indicated by the identified character map.

17. The computer-implemented method of claim 7, further comprising identifying the one or more original strings of text from web page code.

18. The computer-implemented method of claim 7, wherein the character map correlates, for each respective first character among at least some of the first characters, multiple second characters with the respective first character, such that any one of the multiple second characters is available to replace, in obfuscated strings of text, the respective first character from original strings of text.

19. The computer-implemented method of claim 7, wherein the intermediary computing system comprises a proxy server.

20. An intermediary computing system for processing content on behalf of a web server system, the intermediary computing system comprising:
an analysis module, including one or more processors, to identify strings of text from an electronic document;
a font data repository including one or more character maps that correlate, for each character map in the one or more character maps, a first set of characters with a respective different second set of characters;
a re-coding module, including one or more processors, to generate a re-coded document by re-mapping, using a particular one of the one or more character maps, the identified strings of text into corresponding obfuscated strings of text, and by replacing the identified strings of text with the corresponding obfuscated strings of text from the electronic document; and
a data interface, including one or more processors, to transmit the re-coded document to a client computing device.

21. The intermediary computing system of claim 20, wherein the data interface is further configured to transmit a font definition to the client computing device to cause the obfuscated strings of text to visually render at the client computing device as the identified strings of text.

22. The intermediary computing system of claim 20, wherein the re-coding module is configured to re-code the document differently in response to a plurality of requests for the document by re-mapping the identified strings of text using different character maps for each of the requests.

23. The intermediary computing system of claim 20, further comprising an input obfuscation module that is configured to insert program code into the re-coded document to cause the client computing device to re-map characters received as user input at the client computing device to different, corresponding characters based on the particular one of the one or more character maps.

24. The intermediary computing system of claim 20, comprising a proxy server.

25. One or more non-transitory computer-readable storage devices having instructions stored thereon that, when executed by one or more computers, cause performance of operations comprising:
identifying, at an intermediary computing system that processes various content from a web server system before the various content is served over a network to various client computing devices, one or more original strings of text that are to be served to and displayed on a first client computing device, the one or more original strings of text comprising original characters;
identifying, at the intermediary computing system, a character map that correlates first characters with different second characters;
re-mapping the one or more original strings of text using the character map so as to produce one or more obfuscated strings of text, wherein the re-mapping includes substituting, according to the correlations indicated by the character map, each respective original character in the one or more strings of text for a respective obfuscated character; and
providing the one or more obfuscated strings of text to the first client computing device along with code for causing the first client computing device to render the one or more obfuscated strings of text for display using a font definition that maps character positions to glyphs that do not visually match characters at the character positions, such that the one or more obfuscated strings of text will render visually as the one or more original strings of text.

26. The one or more non-transitory storage devices of claim 25, wherein the operations further comprise providing, from the intermediary computing system, the font definition to the first client computing device in conjunction with providing the one or more obfuscated strings to the first client computing device.

27. The one or more non-transitory storage devices of claim 25, wherein identifying the character map comprises selecting the character map from among one or more character maps that were obtained prior to identifying the one or more original strings of text.

28. The one or more non-transitory storage devices of claim 25, wherein the operations further comprise providing, to the first client computing device, code that is programmed to cause the first client computing device to re-map characters received as user input at the first client computing device to different characters according to the correlations indicated by the identified character map.

29. The one or more non-transitory storage devices of claim 25, wherein the character map correlates, for each respective first character among at least some of the first characters, multiple second characters with the respective first character, such that any one of the multiple second characters is available to replace, in obfuscated strings of text, the respective first character from original strings of text.

30. The one or more non-transitory devices of claim 25, wherein the intermediary computing system comprises a proxy server.

* * * * *